US011283315B2

(12) United States Patent
Baer et al.

(10) Patent No.: US 11,283,315 B2
(45) Date of Patent: Mar. 22, 2022

(54) DEVICES TO BE USED AS MAGNETS

(71) Applicant: ACCELERATED SYSTEMS INC., Waterloo (CA)

(72) Inventors: Stanley Baer, Kitchener (CA); Tim Lambert, Los Angeles, CA (US); Willem Jager, Cambridge (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 0 days.

(21) Appl. No.: 17/015,201

(22) Filed: Sep. 9, 2020

(65) Prior Publication Data
US 2020/0412189 A1    Dec. 31, 2020

Related U.S. Application Data

(63) Continuation-in-part of application No. 16/297,915, filed on Mar. 11, 2019, now Pat. No. 10,985,620.

(60) Provisional application No. 62/898,474, filed on Sep. 10, 2019, provisional application No. 62/642,701, filed on Mar. 14, 2018.

(51) Int. Cl.
*H02K 1/27* (2006.01)
*H02K 1/2786* (2022.01)
*H02K 1/02* (2006.01)
*H02K 21/22* (2006.01)
*H02K 1/14* (2006.01)
(Continued)

(52) U.S. Cl.
CPC .......... *H02K 1/2786* (2013.01); *H01F 1/057* (2013.01); *H02K 1/02* (2013.01); *H02K 1/14* (2013.01); *H02K 1/28* (2013.01); *H02K 21/22* (2013.01)

(58) Field of Classification Search
CPC ..... H02K 1/2766; H02K 1/278; H02K 1/2753
See application file for complete search history.

(56) References Cited

U.S. PATENT DOCUMENTS 4,217,508 A * 8/1980 Uzuka .................... H02K 29/06
                                                310/156.26
6,025,667 A    2/2000 Narita et al.
(Continued)

FOREIGN PATENT DOCUMENTS

CN    203166649 U    8/2013
CN    204046382 U    12/2014
(Continued)

OTHER PUBLICATIONS

U.S. Office Action for U.S. Appl. No. 16/297,915, dated Apr. 2, 2020.
(Continued)

*Primary Examiner* — Dang D Le
(74) *Attorney, Agent, or Firm* — Nyssa Inc.

(57) ABSTRACT

There are provided electric motors each having a rotor, a stator, and a plurality of conductive windings each disposed around a corresponding tooth of the stator. The rotor is to rotate about an axis of rotation defining an axial direction. The rotor includes a backiron and a plurality of magnets secured to an inner surface of the backiron. The stator is disposed inside the rotor and centered about the axis of rotation. The stator includes a plurality of teeth each extending radially relative to the axis of rotation towards the inner surface of the backiron and terminating in a corresponding tooth end disposed proximal to the inner surface.

19 Claims, 19 Drawing Sheets

(51) Int. Cl.
*H02K 1/28* (2006.01)
*H01F 1/057* (2006.01)

(56) References Cited

U.S. PATENT DOCUMENTS

| | | | | |
|---|---|---|---|---|
| 7,342,333 | B2* | 3/2008 | Umezu | H02K 1/2786 |
| | | | | 310/58 |
| 7,391,140 | B2* | 6/2008 | Horng | F04D 25/062 |
| | | | | 310/90 |
| RE42,583 | E* | 8/2011 | Ahn | H02K 1/30 |
| | | | | 310/261.1 |
| 8,400,038 | B2 | 3/2013 | Smith | |
| 8,621,896 | B2* | 1/2014 | Kim | H02K 1/30 |
| | | | | 68/140 |
| 8,823,235 | B2 | 9/2014 | Watanabe | |
| 8,901,794 | B2 | 12/2014 | Seigfriedsen | |
| 10,985,620 | B2* | 4/2021 | Baer | H01F 7/02 |

| | | |
|---|---|---|
| 2004/0169575 A1 | 9/2004 | Knauff |
| 2015/0171679 A1 | 6/2015 | Nishiyama et al. |
| 2015/0295457 A1 | 10/2015 | Yamada et al. |

FOREIGN PATENT DOCUMENTS

| | | |
|---|---|---|
| CN | 105322744 A | 2/2016 |
| CN | 105337434 A | 2/2016 |
| CN | 105356704 A | 2/2016 |
| CN | 205051546 U | 2/2016 |
| CN | 106340367 A | 1/2018 |
| JP | 2002110411 A | 4/2002 |
| KR | 20130013011 A | 2/2013 |
| WO | 2014064351 A1 | 5/2014 |

OTHER PUBLICATIONS

U.S. Office Action for U.S. Appl. No. 16/297,915, dated Oct. 15, 2020.

* cited by examiner

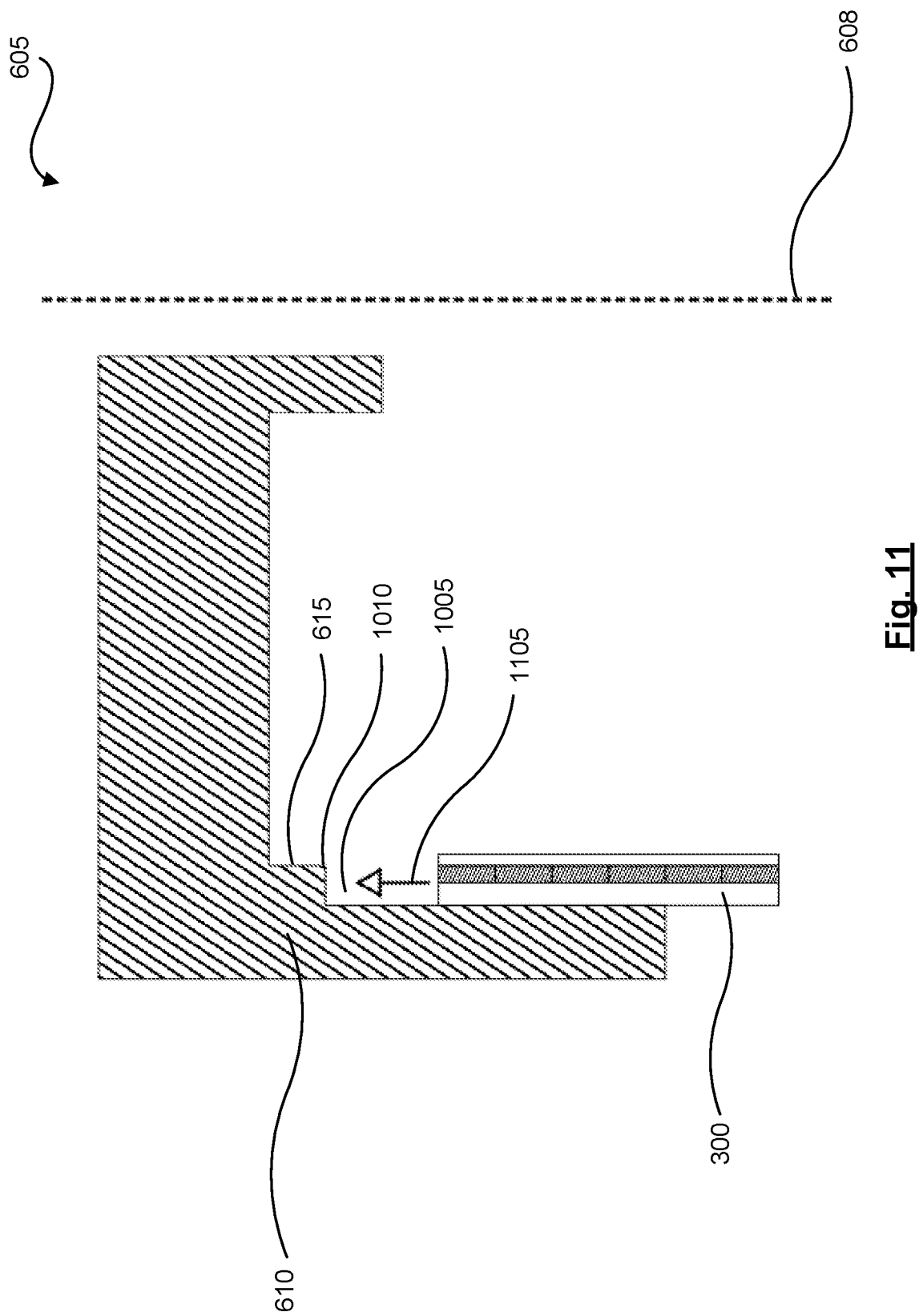

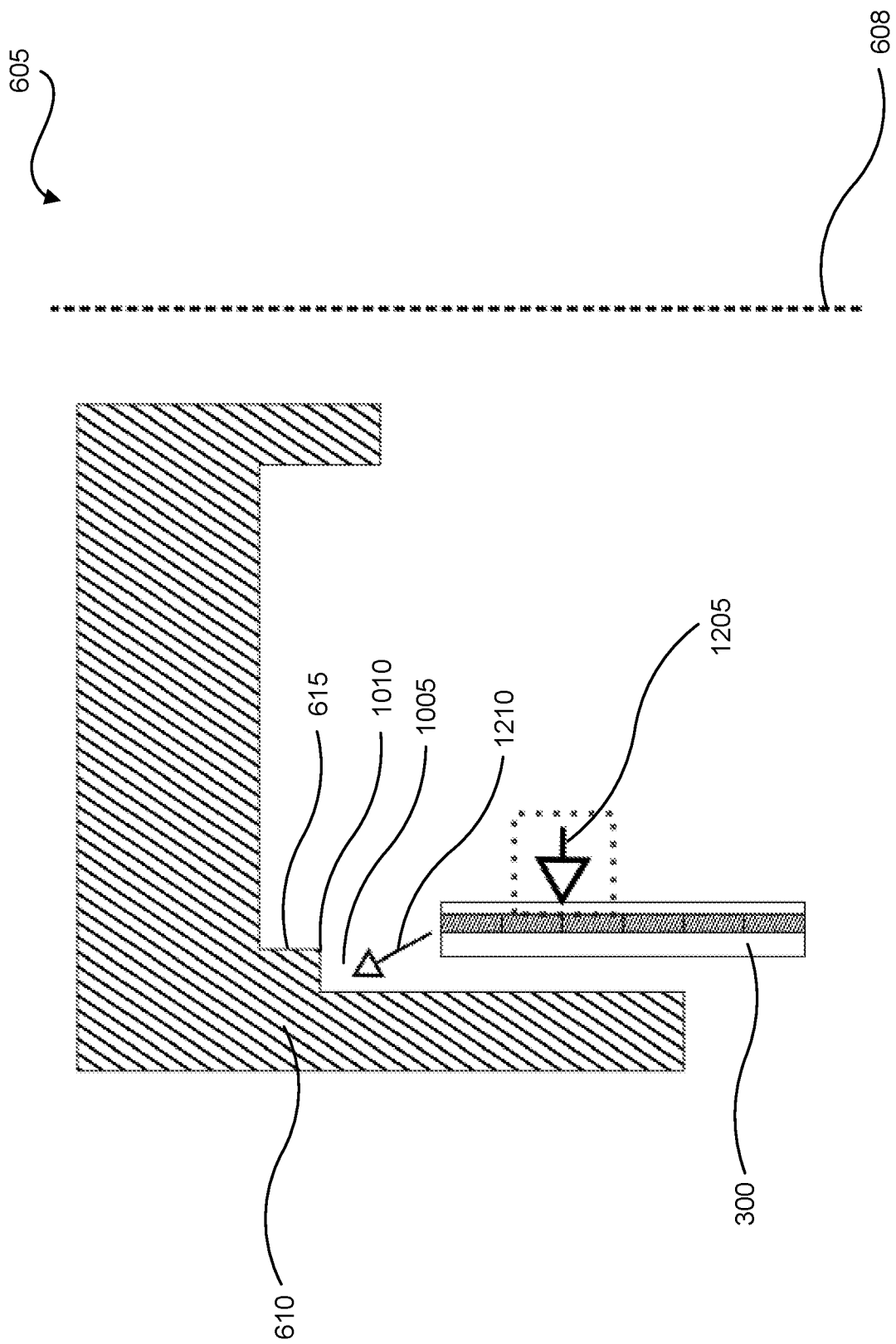

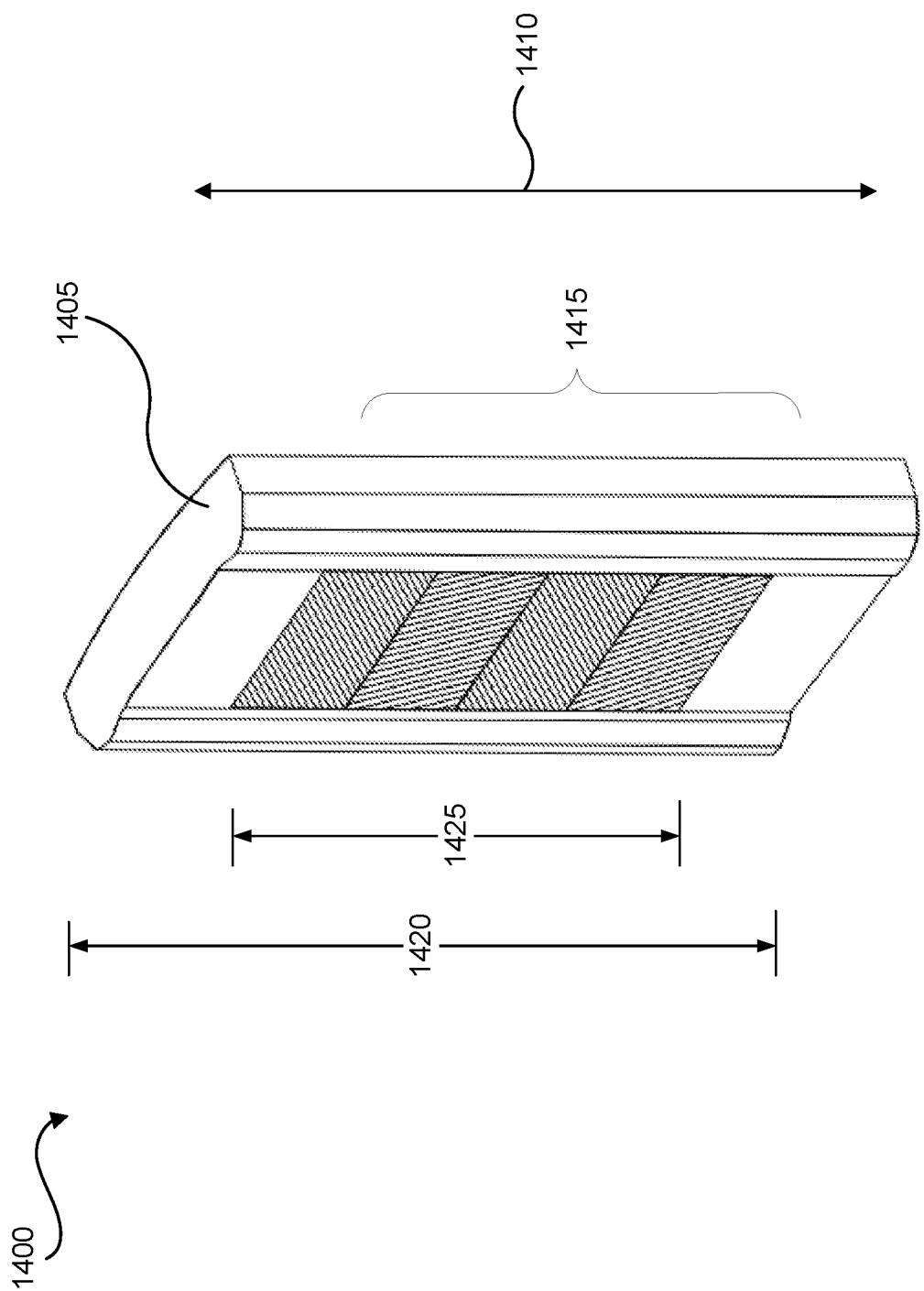

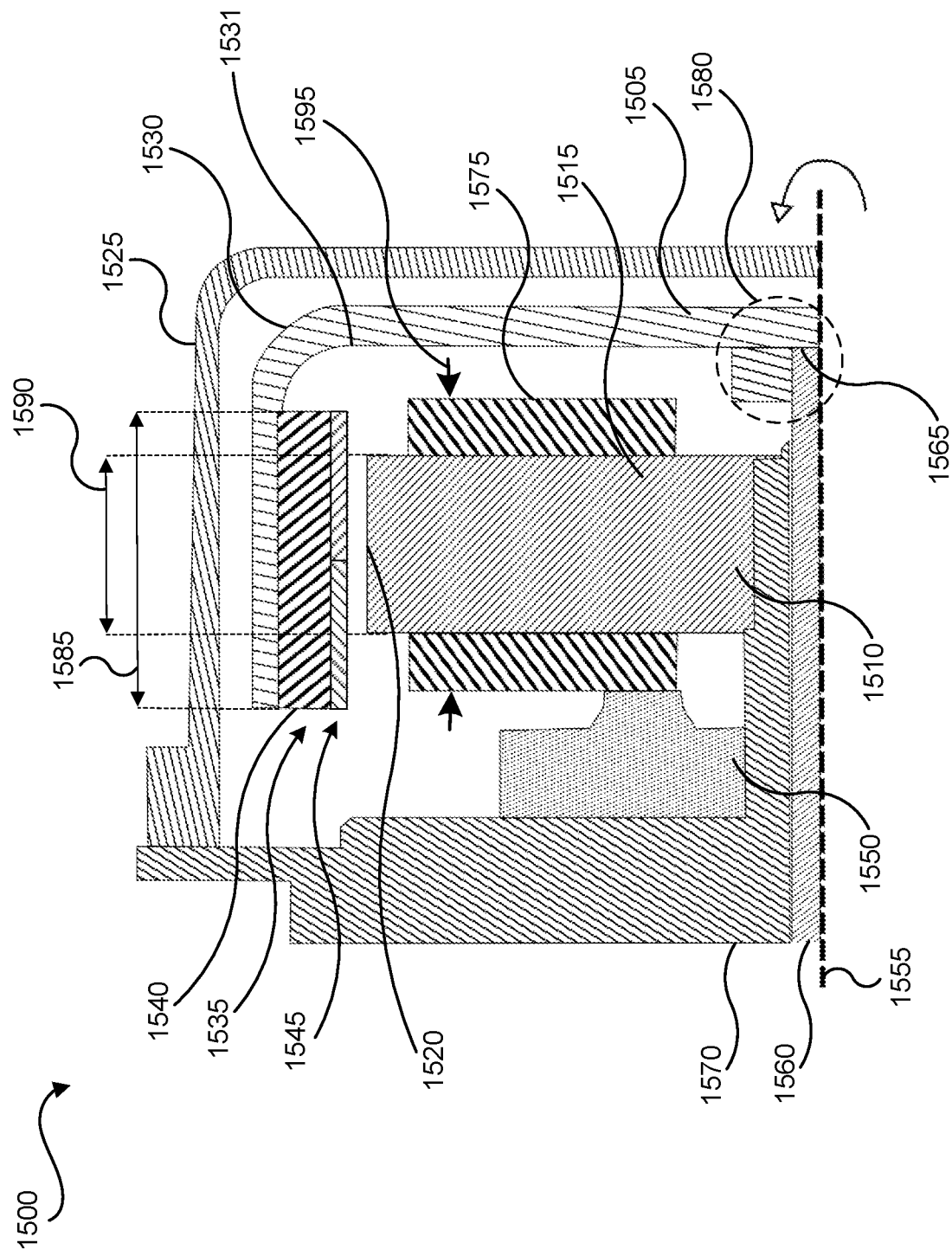

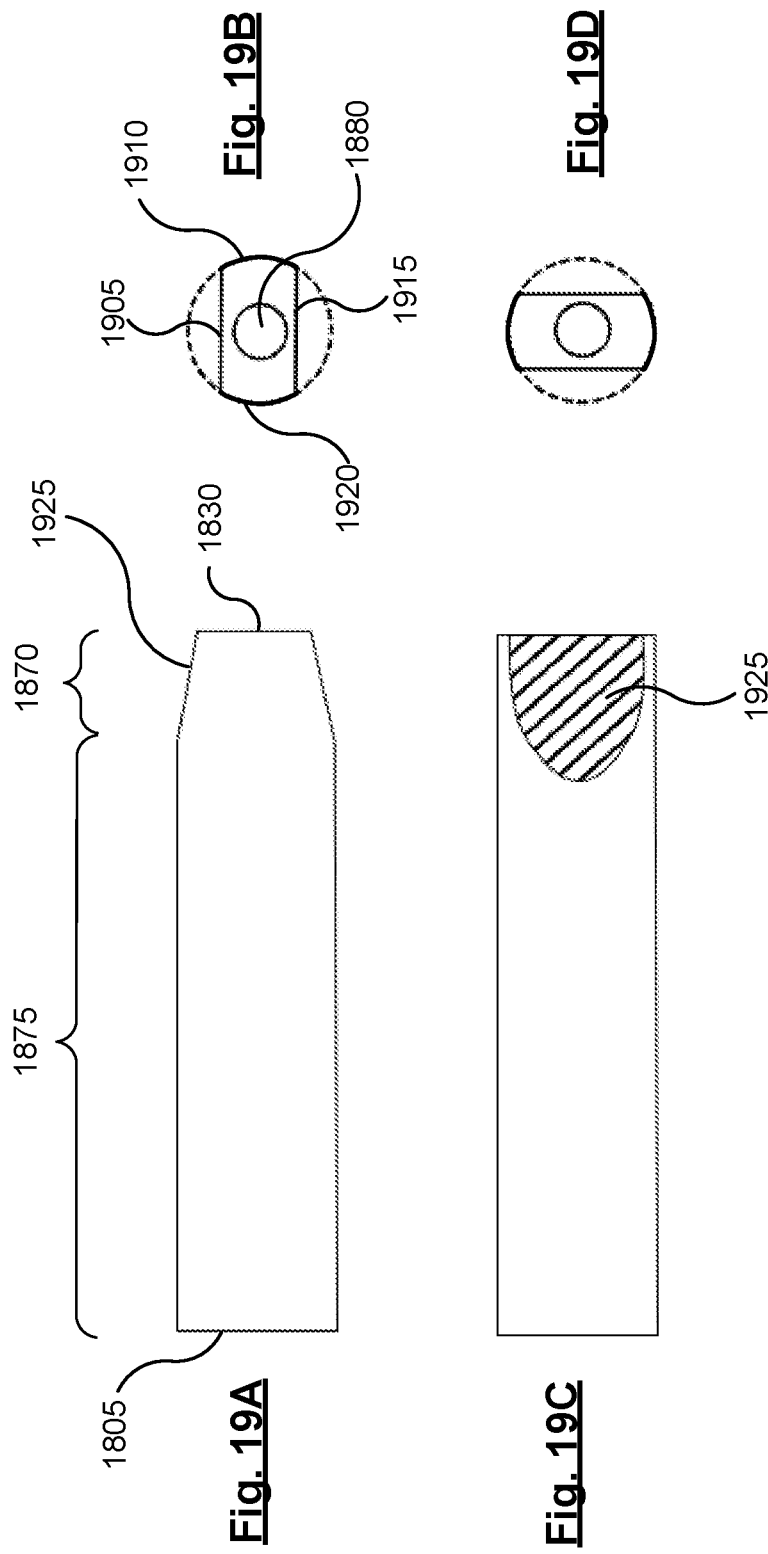

DEVICES TO BE USED AS MAGNETS

CROSS-REFERENCE TO RELATED APPLICATION

This application claims priority from U.S. Provisional Patent Application No. 62/898,474, filed on Sep. 10, 2019, which is incorporated herein by reference in its entirety. This application is also a continuation-in-part of U.S. patent application Ser. No. 16/297,915, filed on Mar. 11, 2019, which is incorporated herein by reference in its entirety.

FIELD

The present specification relates to devices to be used as magnets, and in particular to devices to be used as magnets in electric motors.

BACKGROUND

Electric motors may be used to convert electrical energy into mechanical energy. Some electric motors may have a rotor and a stator. Moreover, electric motors may use a combination of electromagnets and permanent magnets to cause the rotor to rotate relative to the stator.

SUMMARY

According to an implementation of the present specification there is provided an electric motor comprising: a rotor to rotate about an axis of rotation defining an axial direction, the rotor comprising a backiron and a plurality of magnets secured to an inner surface of the backiron, at least one of the magnets comprising: a first member defining a trench extending along a longitudinal direction, the trench having a top being open and a bottom opposite the top, the bottom being proximal to the inner surface and the top being distal from the inner surface, the first member comprising a first material being magnetizable as a permanent magnet, the first member having a first axial dimension measured along the axial direction; a plurality of secondary members secured to the first member, the secondary members received in the trench, the secondary members disposed side-by-side along the longitudinal direction, the secondary members each comprising a corresponding secondary material being magnetizable as a corresponding permanent magnet; a stator disposed inside the rotor and centered about the axis of rotation, the stator comprising a plurality of teeth each extending radially relative to the axis of rotation towards the inner surface of the backiron and terminating in a corresponding tooth end disposed proximal to the inner surface, each tooth end having a second axial dimension measured along the axial direction, the first axial dimension being larger than the second axial dimension; and a plurality of conductive windings each disposed around a corresponding tooth of the stator, each tooth end and its corresponding windings collectively having a third axial dimension measured along the axial direction.

Once the first material is magnetized by an external magnetic field to have a flux density of greater than 0.2 Tesla, the first material may retain a remanent flux density of greater than 0.2 Tesla in the absence of external magnetic fields; and once the first material is magnetized, the first material may not be demagnetized as a result of being subjected to an external magnetic field of 50 kilo Oersteds or less.

The rotor may be positioned relative to the stator in the axial direction such that the second axial dimension is positioned within an extent of the first axial dimension in the axial direction.

The first axial dimension may be larger than the third axial dimension.

The plurality of the secondary members may be disposed side-by-side along the longitudinal direction collectively have a fourth axial dimension measured along the axial direction; and the fourth axial dimension may be larger than the second axial dimension.

The first axial dimension may be larger than the fourth axial dimension.

The fourth axial dimension may be larger than the third axial dimension.

The trench may comprise a width measured along a direction lateral to the longitudinal direction; and the secondary members may span the width of the trench.

The secondary materials may each have magnetic coercivities larger than a corresponding magnetic coercivity of the first material.

The first material may comprise ferrite; and the secondary materials may comprise NdFeB.

The at least one of the magnets may be free of a direct electrically-conductive link between adjacent secondary members.

At least two adjacent secondary members may abut in the longitudinal direction.

The longitudinal direction may be about parallel to the axial direction.

According to another implementation of the present specification there is provided an electric motor comprising: a rotor to rotate about an axis of rotation defining an axial direction, the rotor comprising: a backiron and a plurality of magnets secured to an inner surface of the backiron; and a receiving region to at least partially receive a shaft end of a shaft of the electric motor; a stator disposed inside the rotor and centered about the axis of rotation, the stator comprising a plurality of teeth each extending radially relative to the axis of rotation towards the inner surface of the backiron and terminating in a corresponding tooth end disposed proximal to the inner surface; a plurality of conductive windings each disposed around a corresponding tooth of the stator; the shaft having the shaft end received by the receiving region, the shaft being non-freely-rotating about the axis of rotation relative to the rotor when the shaft end is at least partially received by the receiving region; and a fastener securing the shaft to the rotor by resisting the rotor and the shaft moving away from one another along the axial direction.

The shaft may comprise a first segment along a length of the shaft proximal the shaft end and a second segment along the length of the shaft distal from the shaft end; the first segment may be tapered to thin along the length towards the shaft end; and the receiving region may be tapered to have a shape complementary to the first segment, the receiving region to abut at least a portion of the first segment when the shaft end is received by the receiving region.

The shaft may have a cross-section at the shaft end, the cross-section having an outer perimeter shape comprising an about straight line and an about circular arc, the cross-section defined along a plane normal to the axial direction; and the receiving region may be shaped to have a shape complementary to the outer perimeter shape of the cross-section of the shaft.

The receiving region may be disposed on the inner surface of the backiron.

The fastener may comprise a bolt comprising a threaded portion having a first diameter connected to a bolt end having a second diameter; the backiron may comprise an opening having an opening diameter larger than the first diameter and smaller than the second diameter; the shaft may comprise a depression in the shaft end, the depression extending into the shaft along the axial direction; and the bolt may secure the backiron to the shaft by the threaded portion passing through the opening and being at least partially received into the depression.

At least one of the magnets may comprise: a first member defining a trench extending along a longitudinal direction, the trench having a top being open and a bottom opposite the top, the bottom being proximal to the inner surface and the top being distal from the inner surface, the first member comprising a first material being magnetizable as a permanent magnet; and a plurality of secondary members secured to the first member, the secondary members received in the trench, the secondary members disposed side-by-side along the longitudinal direction, the secondary members each comprising a corresponding secondary material being magnetizable as a corresponding permanent magnet.

The first member may have a first axial dimension measured along the axial direction; and each tooth end may have a second axial dimension measured along the axial direction, the first axial dimension being larger than the second axial dimension.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 11 shows a partial cross-sectional view of the rotor of the motor of FIG. 6.

FIG. 12 shows a partial cross-sectional view of the rotor of the motor of FIG. 6.

FIG. 14 shows a top perspective view of an example device which may be used as a magnet, in accordance with a non-limiting implementation of the present specification.

FIG. 15 shows a partial cross-sectional view of an example electric motor, in accordance with a non-limiting implementation of the present specification.

FIG. 19A shows a partial left side elevation view of a segment of a shaft of the electric motor of FIG. 18. FIG. 19B a front side elevation view of the shaft segments shown in FIG. 19A. FIG. 19C shows a partial top side elevation view of the shaft segment shown in FIG. 19A. FIG. 19D shows the side elevation view of FIG. 19B rotated by 90 degrees.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Some types of electric motors such as brushless electric motors may utilize permanent magnets to produce a rotating magnetic field which does not require electrical power. The rotation of these magnets, and of the field which they produce, causes power to be dissipated in the motor's stator due to the variation in the amplitude of the magnetic field applied to a particular stator region. The arrangement of these magnets may furthermore permit the field generated by the stator to cause variation in the amplitude of the magnetic field applied to a particular rotor region. The combination of these two effects may reduce the efficiency of the energy conversion process in the motor. Changes to the shape, size, material, and relative location of the magnets, and changes to the shape, size, and material of the stator, and other alterations to the magnet or motor design may be used to reduce this efficiency-reducing impact.

Figure 1:
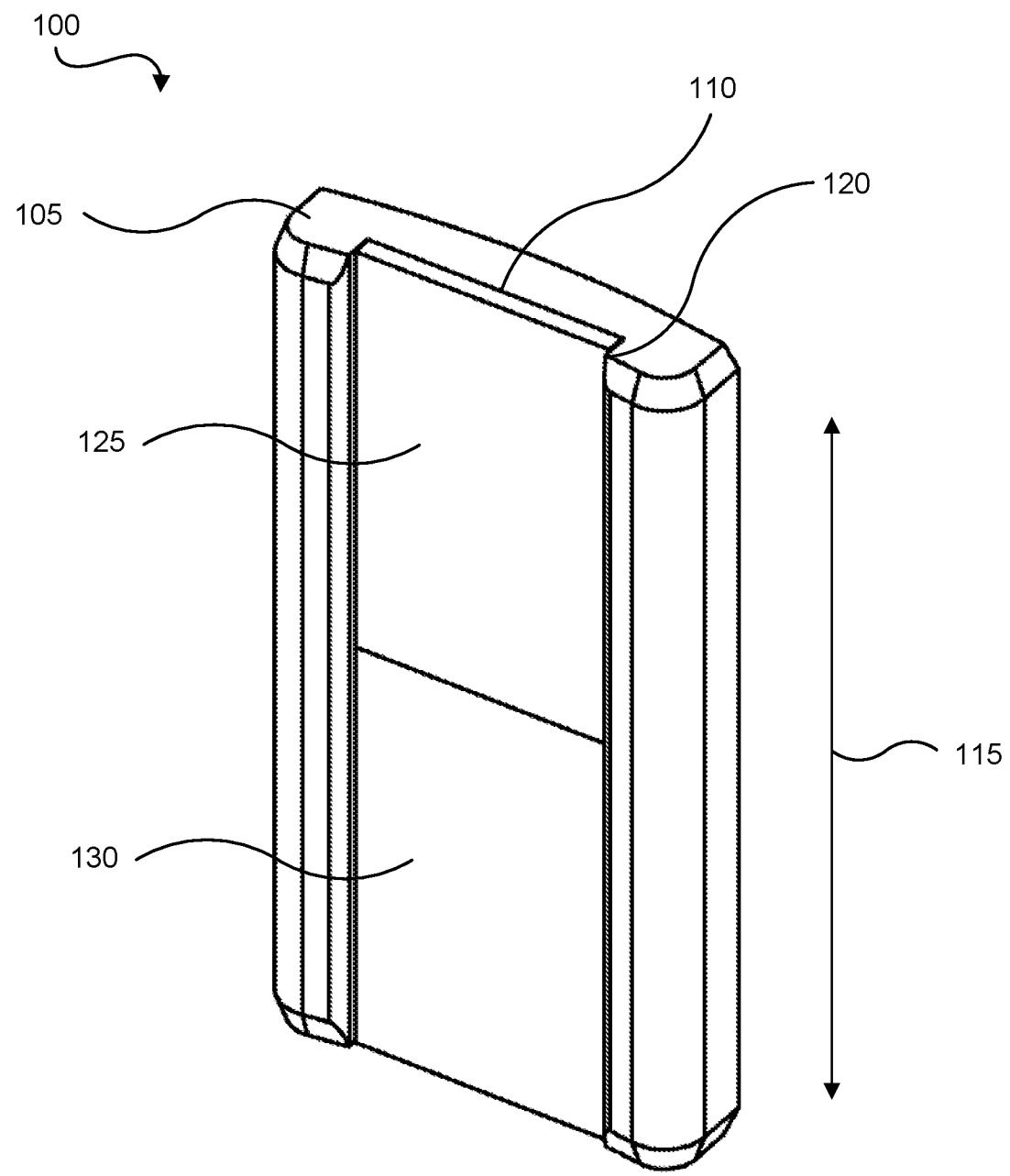
FIG. 1 shows a top perspective view of an example device which may be used as a magnet, in accordance with a non-limiting implementation of the present specification.

One particular alteration to the design of the motor which may reduce the amount of power dissipated in the rotor and the stator is the usage of permanent magnet materials with a relatively low electrical conductivity. These materials may permit less electrical current to circulate in the rotor components, and may also generate less variation in the amplitude of the magnetic field applied to the stator by the rotor. Many of these low-conductivity materials do, however, also possess low magnetic coercivities and low remanent magnetic flux densities. High coercivity and remanent flux density are indicative of a high energy density magnet which may be used to produce a motor with a higher power density, while the opposite is true of a magnet with a low coercivity and a low remanent flux density. FIG. 1 shows an example device 100 which may be used as a magnet having relatively high coercivity and relatively high remanent flux density, while also having relatively low electrical conductivity.

FIG. 1 shows a top perspective view of device 100, which comprises a first member 105 defining a trench 110 extending along a longitudinal direction 115. Trench 110 may also be described as a channel. In addition, longitudinal direction 115 may be used to describe one or both of the directions indicated by the corresponding two-headed arrow shown in FIG. 1. Trench 110 may have a top 120 which is open. Member 105 may comprise a material that is magnetizable. This in turn may allow member 105 to become magnetized and to be used as a permanent magnet.

In addition, device 100 comprises a second member 125 and a third member 130 secured to member 105. Members 125 and 130 are received in trench 110. In some examples, being received in trench 110 may secure members 125 and 130 to member 105. Moreover, in some examples members 125 and 130 may be received in trench 110, and adhesives, fasteners, or other securing methods or mechanism may be used to secure members 125 and 130 to member 105.

Second member 125 may comprise a second material which is magnetizable. Similarly, third member 130 may comprise a third material which is magnetizable. In this manner, members 125 and 130 may be magnetized and may be used as permanent magnets. In some examples, the second material may be the same as the third material. Furthermore, in some examples members 125 and 130 may have the same material composition.

In some examples, the second material and the third material may have magnetic coercivities larger than a corresponding magnetic coercivity of the first material. As such, once magnetized, device 100 may be able to act as a hybrid magnet providing a low coercivity magnet in member 105 and providing high coercivity magnets in members 125 and 130. In some examples, member 105 may comprise ferrite and members 125 and 130 may comprise NdFeB. Moreover, in some examples, member 105 may comprise a magnetically-hard ferrite.

As described above, in some examples, members 105, 125, and 130 may comprise a material that is magnetizable to allow members 105, 125, and 130 to become magnetized as permanent magnets. It is contemplated that in some examples, one or more of members 105, 125, and 130 may each comprise materials which, once magnetized by an external magnetic field to have a flux density of greater than a flux density threshold, retain a remanent flux density of greater than the flux density threshold in the absence of external magnetic fields. In other words, once one or more of members 105, 125, and 130 are magnetized by an external magnetic field to become a permanent magnet having a flux density of greater than the flux density threshold, then that permanent magnet retains a remanent flux density of greater than the flux density threshold once that external magnetic field is removed. In some examples, the flux density threshold may be about 0.2 Tesla.

Moreover, it is contemplated that in some examples, one or more of members 105, 125, and 130 may each comprise materials which, once magnetized to become permanent magnets, resist becoming demagnetized as a result of being subjected to an external magnetic field having a magnitude equal to or less than a magnetic field threshold. In some examples, the magnetic field threshold may be about 50 kilo Oersteds. This resistance to being demagnetized may allow these permanent magnets to remain in a linear region of their magnetization curve (i.e. BH curve) under certain operating conditions, such that variances in externally applied fields applied to the magnets during the use of the magnets do not cause the magnets to progressively demagnetize. Furthermore, it is contemplated that in some examples, becoming demagnetized may comprise a partial or full reduction in a permanent magnet's magnetization caused by that magnet being subjected to changes in an external magnetic field.

In addition, in some examples, the material of one or more of members 105, 125, and 130 may be selected from NdFeB, SmCo, AlNiCo, Ferrite, PtCo, and SmFeN. Furthermore, in some examples, the remanent flux density and resistance to demagnetization properties of the materials of members 105, 125, and 130 described herein may allow hybrid magnets such as device 100 to be used in different applications, such as being used as permanent magnets in rotors of electric motors, and the like.

As shown in FIG. 1, second member 125 and third member 130 are disposed side-by-side along longitudinal direction 115. In other words, members 125 and 130 are stacked, positioned sequentially. or positioned one beside the other in longitudinal direction 115. While FIG. 1 shows members 125 and 130 as abutting or touching one another in the longitudinal direction, it is contemplated that in some examples members 125 and 130 may be spaced from one another in longitudinal direction 115, or may be separated from one anther in longitudinal direction 115 by a spacer.

As discussed above, members 125 and 130 may comprise materials with high magnetic coercivities, and once magnetized may act as high coercivity magnets. As such, in device 100 the high coercivity component is divided into two segments, i.e. members 125 and 130. Dividing the high coercivity component into multiple segments may reduce electrical conductance in the high coercivity component along longitudinal direction 115.

While in FIG. 1 the dividing boundary between members 125 and 130 is along the straight edges of members 125 and 130, which edges are oriented about perpendicularly to longitudinal direction 115, it is contemplated that in some examples the boundary between members 125 and 130 need not be straight nor to be oriented perpendicularly to the longitudinal direction. For example, the boundary may be curved, zigzag, stepped, slanted, and the like.

In order to maintain the reduction in electrical conductance in the high coercivity component in longitudinal direction 115, in some examples device 100 may be free of a direct electrically-conductive link between second member 125 and third member 130. Examples of such direct electrically-conductive links may include bridges or connectors formed integrally with or between members 125 and 130, welds or solder quantities electrically connecting members 125 and 130, wires or other electrical connectors between members 125 and 130, and the like.

Moreover, while FIG. 1 shows members 125 and 130 as having the same shape and size as one another, it is contemplated that in some examples members 125 and 130 may have shapes, sizes, compositions, electrical properties, or magnetic properties that are different from one another. Furthermore, in some examples device 100 may comprise more than two members received in trench 110 and disposed side-by-side along longitudinal direction 115. Furthermore, it is contemplated that in some examples member 105 may have a shape or size different than those shown in FIG. 1.

Figure 2:
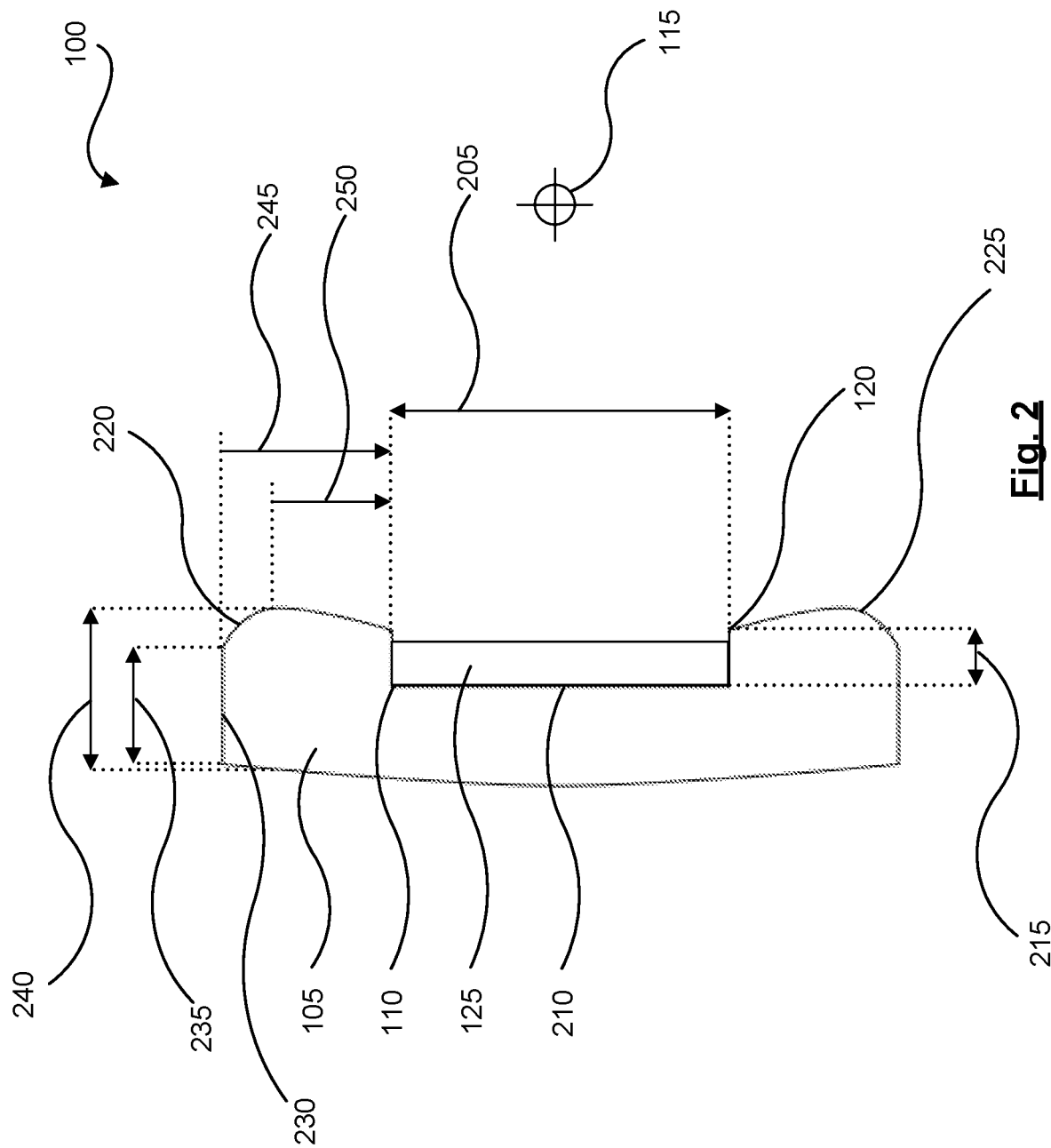
FIG. 2 shows a top plan view of the device of FIG. 1.

Turing now to FIG. 2, a top plan view is shown of device 100. Trench 110 comprises a width 205 measured along a direction lateral to longitudinal direction 115. This lateral direction is shown by the arrow associated with width 205 in FIG. 2. Second member 125 and third member 130 (not visible in FIG. 2) span width 205 of trench 110. It is contemplated that in some examples, the second and third members received in the trench may have respective widths smaller than width 205, such that the second and third members may fall short of spanning width 205 of trench 110.

Moreover, as shown in FIG. 2, trench 110 may have a bottom 210 opposite top 120. While bottom 210 is shown as being substantially planar in FIG. 2, it is contemplated that in some examples the bottom of the trench may have a shape other than planar. For example, the trench bottom may be U-shaped, V-shaped, and the like. Furthermore, it is contemplated that in some examples the trench itself may have a cross-sectional shape that is different than rectangular; for example, the trench may have a cross-sectional shape that is triangular, U-shaped, and the like. In device 100, members 125 and 130 each comprise a substantially planar surface that is adjacent to and abutting bottom 210. It is contemplated that in some examples members 125 and 130 may have non-planar surfaces that are shaped to abut against a complementarily-shaped bottom of the trench, or may have different shapes.

Furthermore, a depth 215 may be measured between top 120 and bottom 210 of trench 110 along a second direction indicated by the arrow associated with depth 215 in FIG. 2. FIG. 2 shows that depth 215 of trench 110 may be larger than a height of member 125, such that member 125 abuts against bottom 210 but does not reach top 120 of trench 110. It is contemplated that in some examples, the members received in the trench may have a height that is the same as or greater than the depth of the trench.

In addition, as shown in FIG. 2, member 105 has rounded corners 220 and 225. The use of rounded corners reduces the use of sharp corners which may be more susceptible to being demagnetized when device 100 is magnetized and in operation as a magnet. In some examples, the corners need not be rounded, and may be cut-off, truncated, or otherwise shaped to reduce the sharpness of the corners.

In other words, member 105 may be shaped to have its thickness, measured along the direction indicated by the arrow associated with depth 215, increase when moving from a lateral edge 230 of member 105 towards trench 110. For example, a thickness 235 of member 105 at lateral edge 230 may be smaller than a thickness 240 measured at a point closer to trench 110 than lateral edge 230. FIG. 2 shows that a distance 245 of lateral edge 230 to trench 110 is larger than a distance 250 to trench 110 at which point thickness 240 is measured. As shown in FIG. 2, distances 245 and 250 may be measured along the direction indicated by the arrow associated with width 205.

In FIG. 2, the thickness of member 105 increases from lateral edge 230 towards trench 110 up to the point where thickness 240 is measured, and then the thickness decreases when progressing further towards trench 110. It is contemplated that in other examples the thickness may vary as a function of distance from the trench in a manner different than that shown in FIG. 2. Moreover, while FIG. 2 shows member 105 having rounded corners 220 and 225, it is contemplated that in some examples member 105 may have a different number or combination of its corners rounded, or may have sharp corners.

Figure 3:
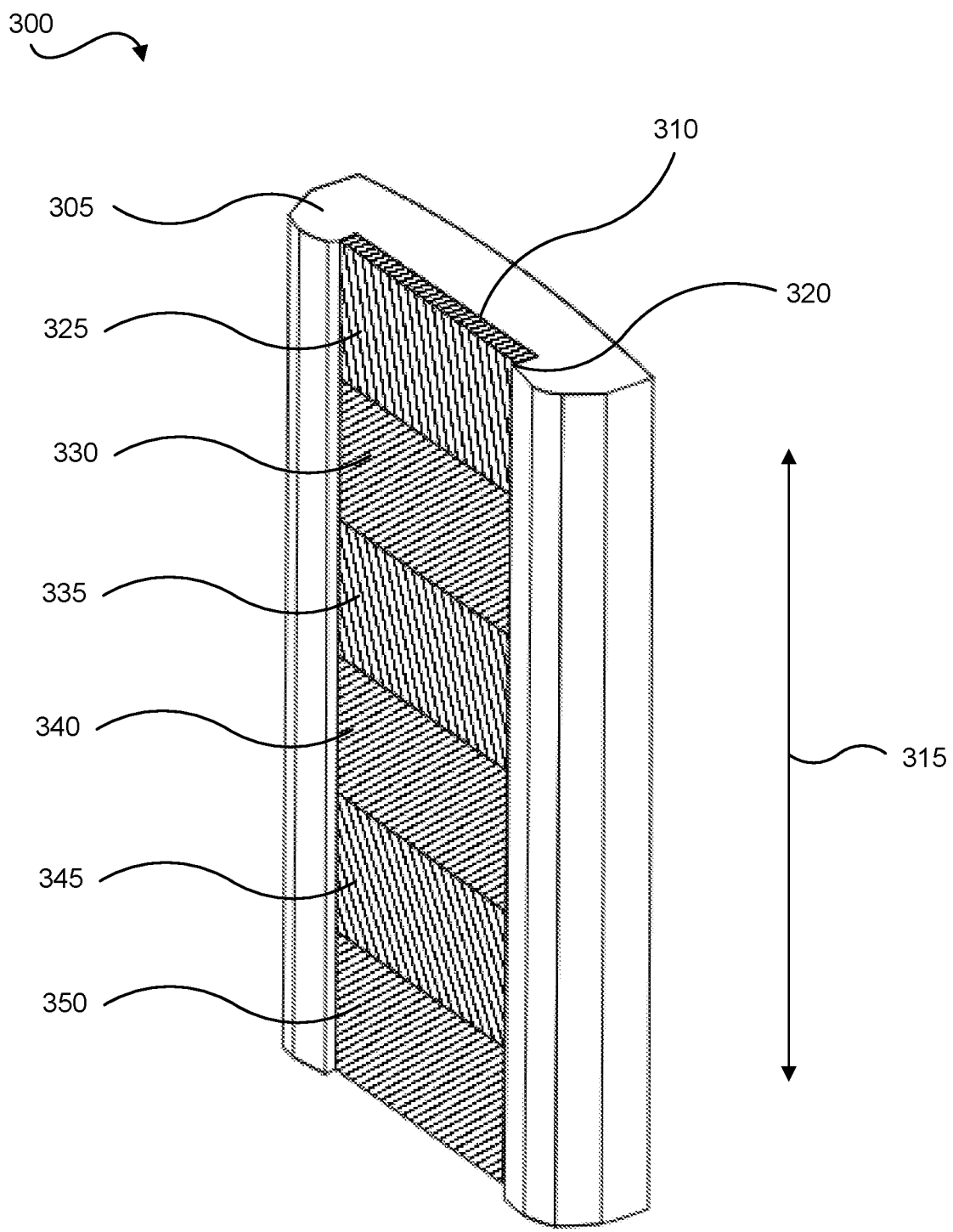
FIG. 3 shows a top perspective view of another example device which may be used as a magnet, in accordance with a non-limiting implementation of the present specification.

As discussed above, in some examples device 100 may further comprise at least one additional member secured to first member 105, which additional member may be received in trench 110. The additional member may comprise a corresponding additional material being magnetizable, and the additional member may be disposed side-by-side along longitudinal direction 115 with second member 125 and third member 130. For example, FIG. 3 shows a top perspective view of an example device 300, which may be similar to device 100. One difference between device 300 and device 100 is that device 300 comprises six members received in the trench.

Turning now to FIG. 3, device 300 comprises a first member 305, which defines a trench 310 extending along a longitudinal direction 315. Trench 310 may have an open top 320. Members 325, 330, 335, 340, 345, and 350 may be received in trench 310 and may be secured to member 305. Moreover, members 325, 330, 335, 340, 345, and 350 may be disposed side-by-side along longitudinal direction 315. Furthermore, member 305 and members 325, 330, 335, 340, 345, and 350 may comprise respective materials that are magnetizable. This in turn may allow device 300 to be magnetized, and be used as a magnet.

Figure 4:
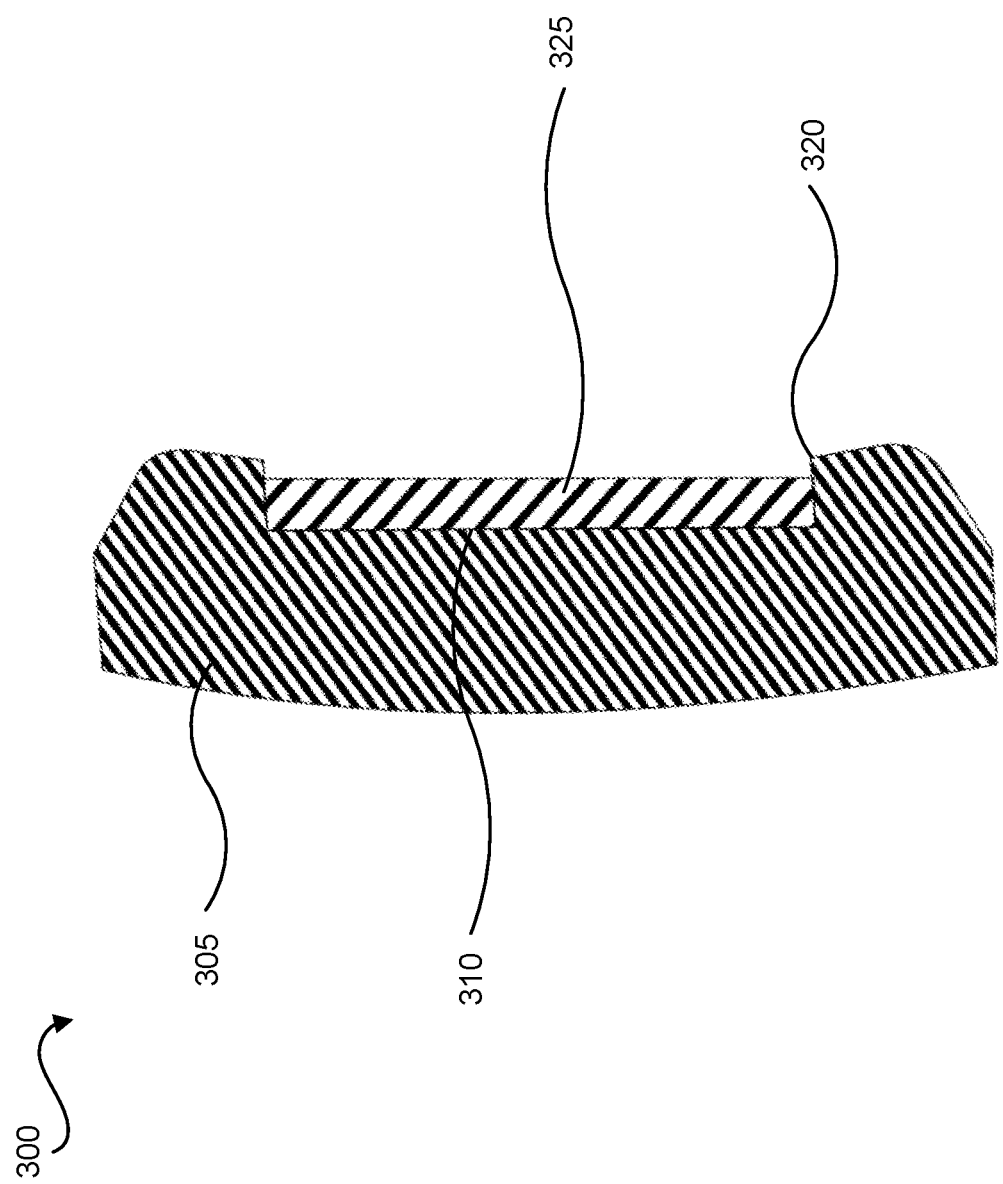
FIG. 4 shows a cross-sectional view of the device of FIG. 3.

In some examples, members 325, 330, 335, 340, 345, and 350 may have a magnetic coercivity larger than the magnetic coercivity of member 305. Moreover, while FIG. 3 shows members 325, 330, 335, 340, 345, and 350 as having the same size and shape as one another, it is contemplated that in some examples members 325, 330, 335, 340, 345, and 350 may have sizes, shapes, material compositions, or electric or magnetic properties that are different from one another. FIG. 4 shows a cross-sectional view of device 300.

Figure 5:
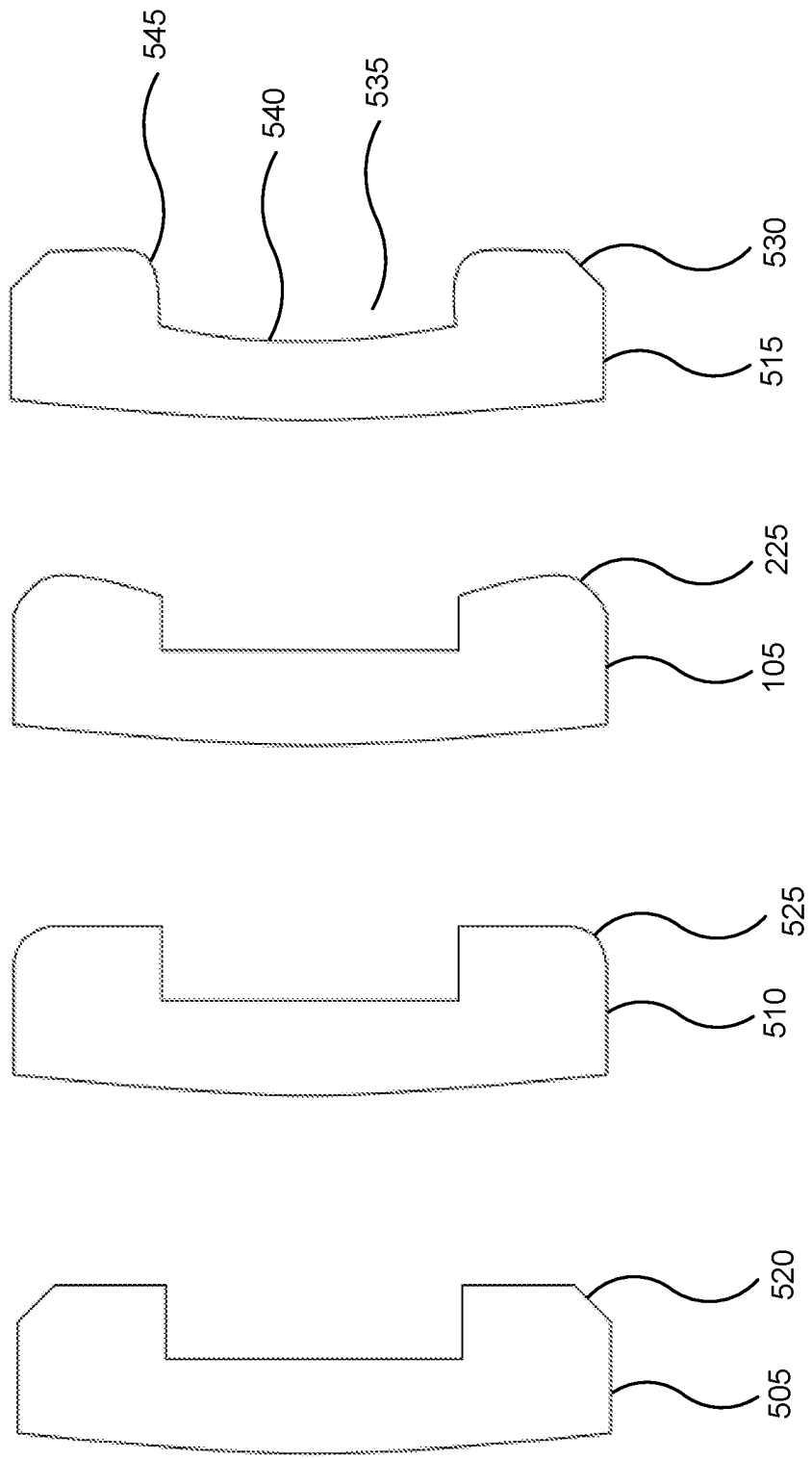
FIG. 5 shows top plan views of example members that may be used as part of a device which may be used as a magnet, in accordance with a non-limiting implementation of the present specification.

Turning now to FIG. 5, top plan views of example members 105, 505, 510, and 515 are shown. The latter three members may have a function and composition similar to member 105. One difference between members 505, 510, and 515 and member 105 is the shape of their outer perimeter. This outer perimeter may also be described as the cross-sectional shape of these members.

Member 505 comprises an angled or truncated corner 520. Member 510, in turn, comprises a rounded corner 525. Moreover, member 515 also comprises an angled or truncated corner 530, as well a trench 535 which comprises a curved bottom 540 and a rounded trench top corner 545. Changing the shape of the member defining the trench may be used to tailor the magnetic properties of the corresponding devices in which the members are used. In some examples, the shape of the member defining the trench may be tailored to reduce the total magnet-induced loss in an electric motor in which the devices described herein are used as permanent magnets.

Figure 13B:
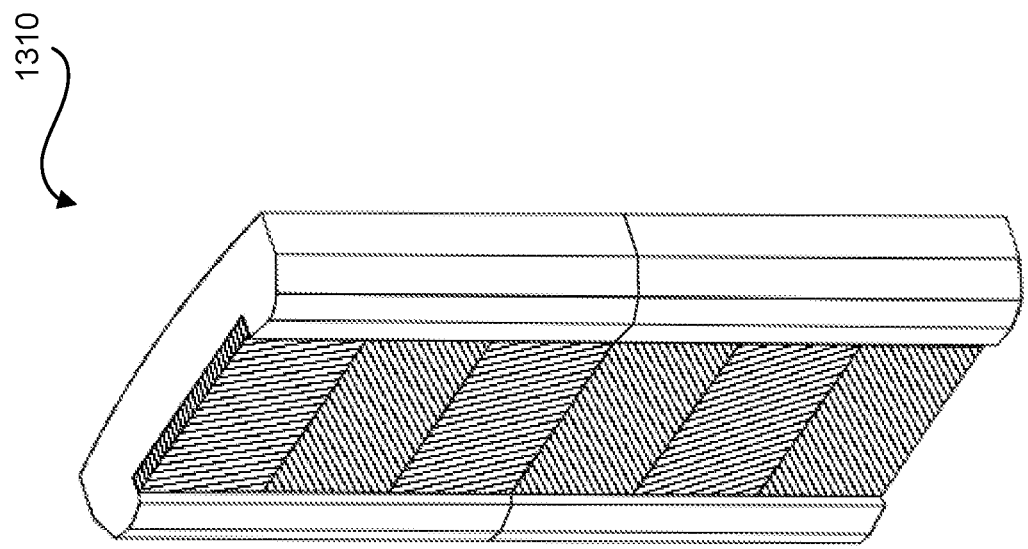
FIGS. 13A and 13B show top perspective views of example devices which may be used as magnets, in accordance with non-limiting implementations of the present specification.
Figure 13A:
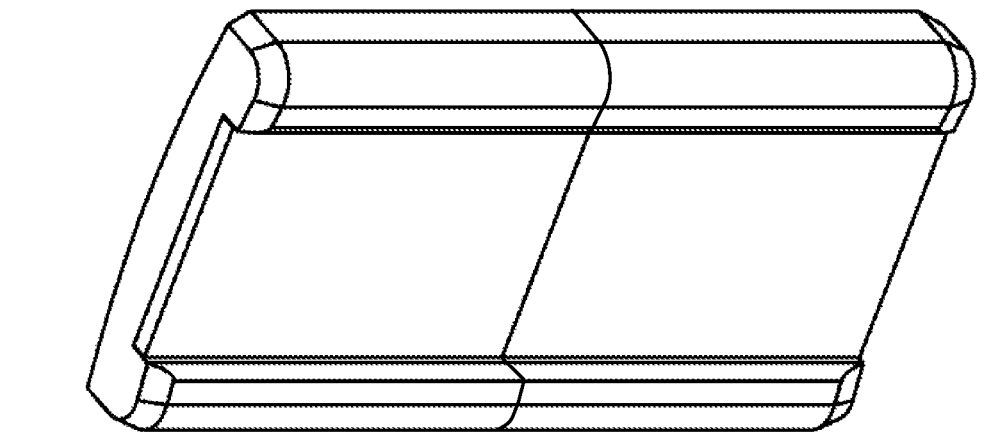

Furthermore, it is contemplated that in some examples the member defining the trench may itself also comprise a plurality of segments secured to one another and disposed side-by-side along the longitudinal direction defined by the trench. Two examples of such hybrid magnets are shown in FIGS. 13A and 13B. Moreover, in some examples where the member defining the trench comprises a plurality of segments, the number of the segments of the member defining the trench may be fewer than the number of members received in the trench.

Figure 6:
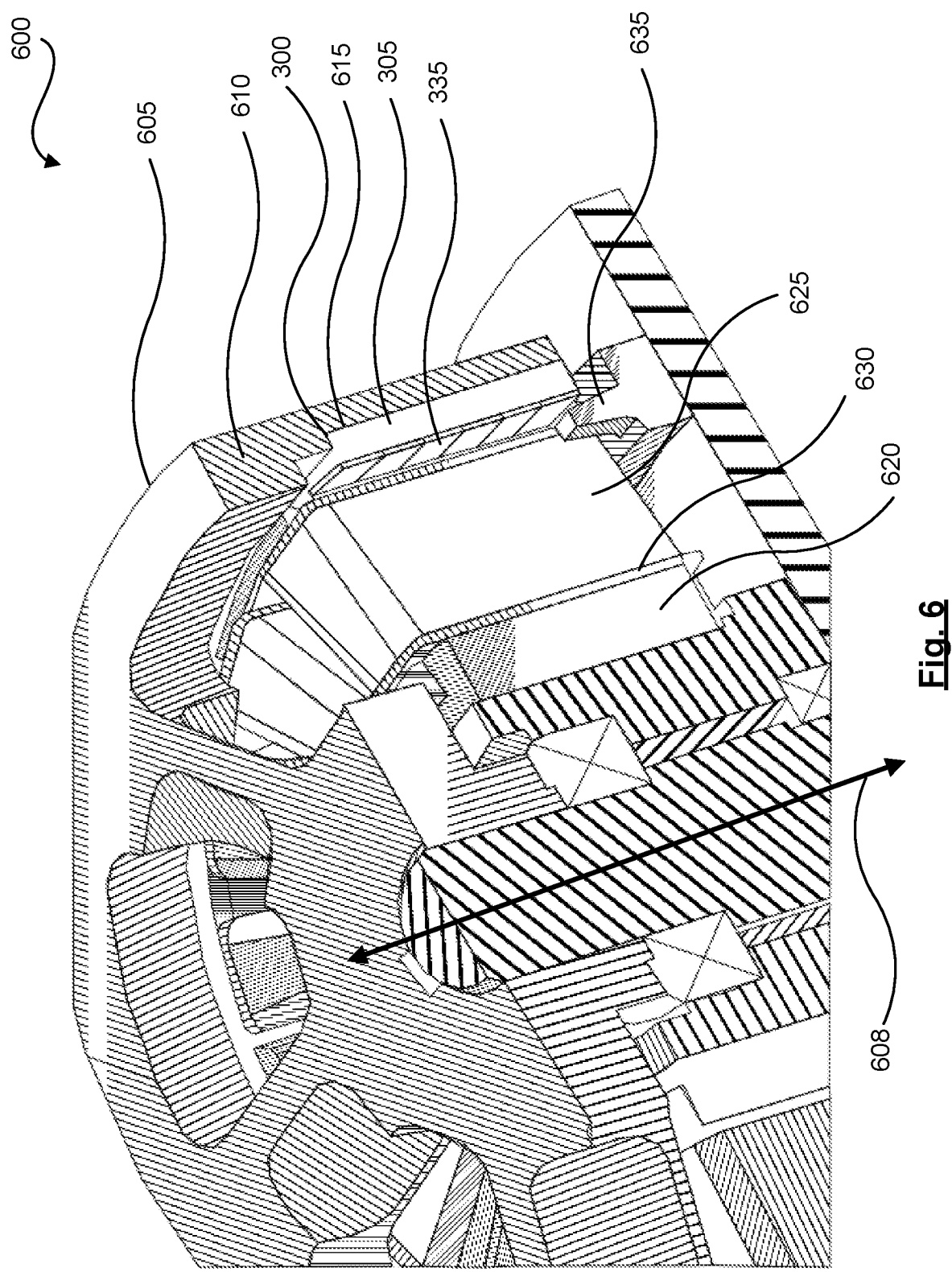
FIG. 6 shows a top perspective partial cutaway view of an example electric motor, in accordance with a non-limiting implementation of the present specification.

Turning now to FIG. 6, a top perspective partial cutaway view is shown of an example electric motor 600. Electric motor 600 comprises a rotor 605 to rotate about an axis of rotation 608. Axis of rotation 608 in turn defines an axial direction indicated by the arrow corresponding to axis of rotation 608 in FIG. 6. Rotor 605 comprises a backiron 610 and a plurality of devices 300 secured to an inner surface 615 of backiron 610. Devices 300 may be magnetized to act as permanent magnets in motor 600. Inner surface 615 may also be described as a proximal surface, as inner surface 615 is proximate to the teeth of a stator 620 of motor 600, as will be described in greater detail below. Moreover, in some examples backiron 610 may comprise a material such as ductile steel, and the like.

The trench in the first member of devices 300 opens away from inner surface 615 of backiron 610. In other words, the bottom of the trench is proximal to inner surface 615 and the top of the trench is distal from inner surface 615. In some examples, the longitudinal axis defined by the trench of devices 300 may be about parallel to the axial direction defined by axis of rotation 608.

Motor 600 also comprises a stator 620 disposed inside rotor 605 and centered about axis of rotation 608. Stator 620 comprises a plurality of teeth each extending radially to the axial direction towards inner surface 615 of backiron 610. The stator teeth are not directly visible in FIG. 6, as they are each covered by corresponding conductive windings. One such winding is a winding 625 shown in FIG. 6. An insulator 630 may electrically insulate winding 625 from its corresponding stator tooth.

In some examples, the insulator may comprise a bobbin. Moreover, in some examples the winding may be wound around the bobbin and then placed over the corresponding stator tooth. Furthermore, in some examples the bobbin may be placed over the corresponding tooth and the winding may then be wound on the bobbin.

Furthermore, motor 600 may also comprise a sensor 635 to sense the position or the direction of rotation of rotor 605 in relation to stator 620. In some examples, sensor 635 may comprise a Hall-effect sensor, or the like. Moreover, as shown in FIG. 6, in some examples sensor 635 may be secured to a portion of stator 620 and be at least partially disposed between the teeth of stator 620 and devices 300 secured to inner surface 615 of backiron 610. This positioning, in turn, may allow sensor 635 to change its state, i.e. to sense, the rotor moving and the direction of rotation. In some examples, the height along the axial direction to which sensor 635 extends between the teeth of the stator and the magnets of the rotor may be adjusted to tailor the sensing performance of sensor 635. Moreover, it is contemplated that in some examples motor 600 need not comprise sensor 635.

Figure 7:
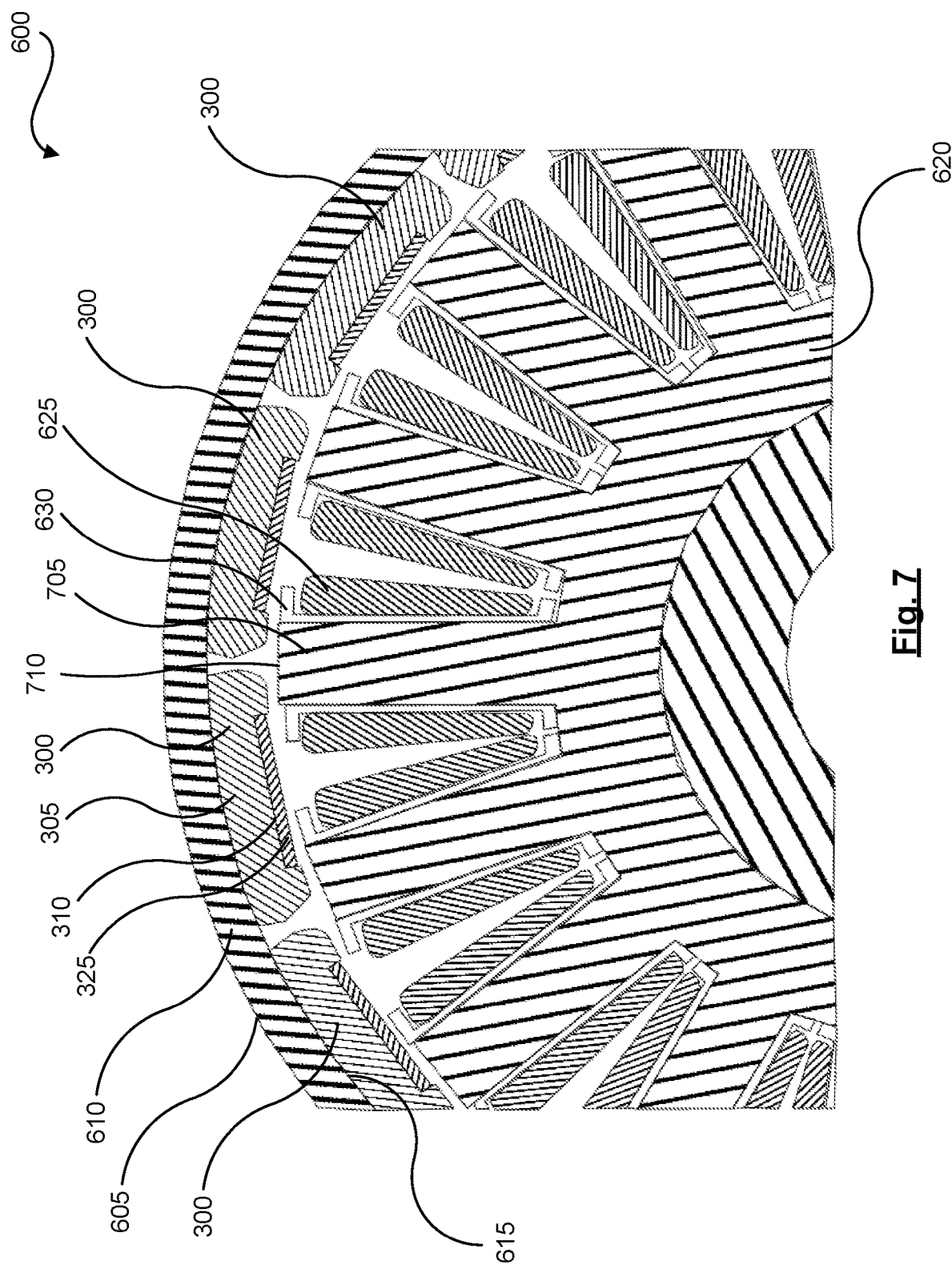
FIG. 7 shows a partial cross-sectional view of the motor of FIG. 6.

Turning now to FIG. 7, a partial cross-sectional view is shown of motor 600. This cross-section is made along a plane perpendicular to the axis of rotation. FIG. 7 shows a plurality of devices 300 secured to inner surface 615 of backiron 610 of rotor 605. As discussed above, devices 300 may be magnetized to act as permanent magnets in motor 600. Moreover, FIG. 7 shows a plurality of stator teeth extending radially towards inner surface 615 and devices 300. For ease and clarity of illustration, only one of these teeth, i.e. tooth 705, is numbered in FIG. 7. Tooth 705 terminates in a tooth end 710, which is disposed proximal to inner surface 615 and devices 300. The other stator teeth may have a structure and function similar to tooth 705.

Figure 8:
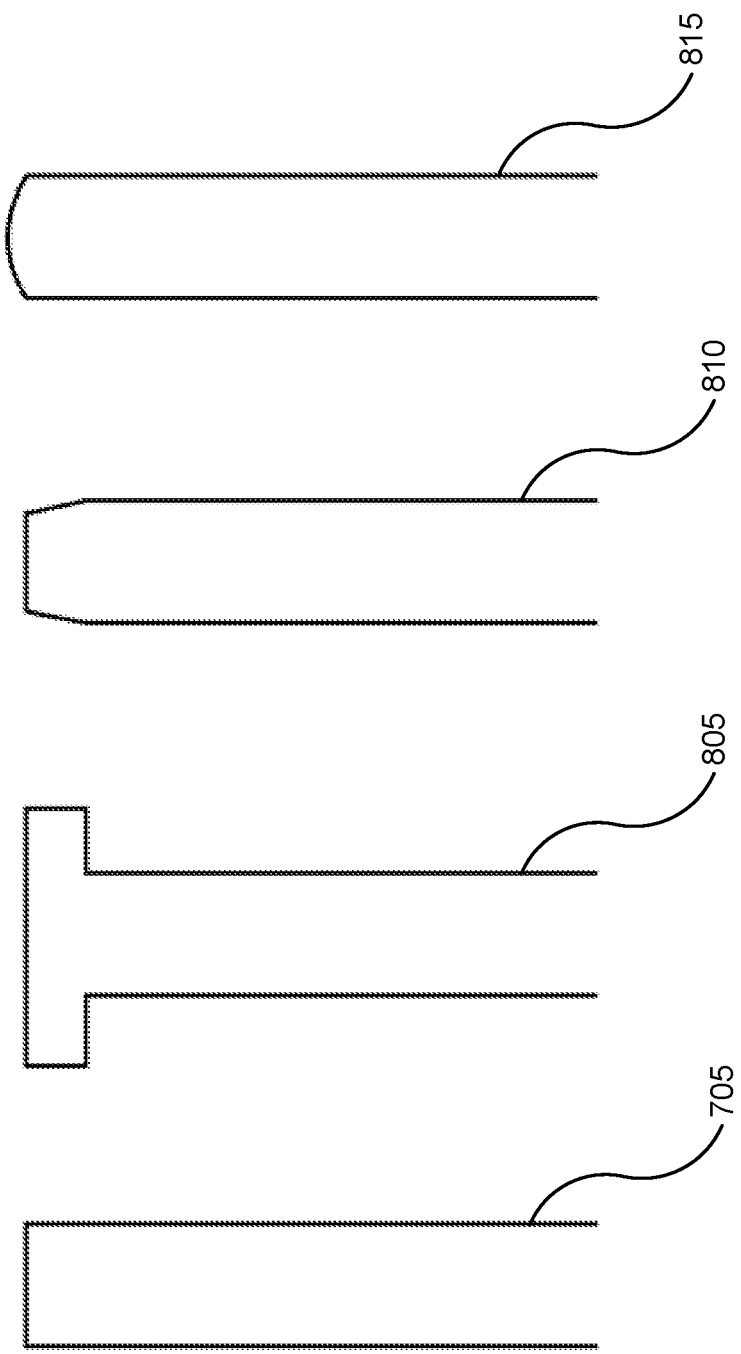
FIG. 8 shows top plan views of example stator teeth for an electric motor, in accordance with a non-limiting implementation of the present specification.

While FIG. 7 shows tooth 705 as having a rectangular shape, it is contemplated that the stator teeth may have different shapes. For example, FIG. 8 shows examples of a T-shaped tooth 805, a drafted shaped tooth 810, and a rounded shaped tooth 815. The shape of the stator teeth may be designed to tailor the magnetic properties of the stator and, in turn, the performance of the electric motor. It is contemplated that in some examples, the stator teeth may have shapes other than those shown in FIG. 8.

Referring back to FIG. 7, trench 310 in member 305 opens away from inner surface 615 and towards stator teeth ends of stator teeth, such as tooth end 710 of tooth 705. In this orientation, high coercivity members such as member 325 are positioned proximal to the ends of the stator teeth. In addition, in this orientation low coercivity members such as member 305 may increase the separation distance, measured in a radial direction radial to the axis of rotation, between backiron 610 and the teeth ends of the teeth of stator 620. This increased separation may in turn reduce the amplitude of higher-order spatial harmonics in the magnetic flux generated by rotor 605, which higher-order spatial harmonics may contribute to degrading the performance of motor 600.

While motor 600 is shown as comprising devices 300 to act as permanent magnets, it is contemplated that motor 600 may use device 100 or the other devices described herein, in addition to or instead of devices 300. Moreover, FIGS. 6 and 7 show that in motor 600 the longitudinal direction of the trenches of devices 300 is about parallel to the axis of rotation of the rotor. It is contemplated that in some examples the longitudinal direction of the trenches of the devices used as permanent magnets in the rotor need not be parallel to the axis of rotation of the rotor.

Figure 9:
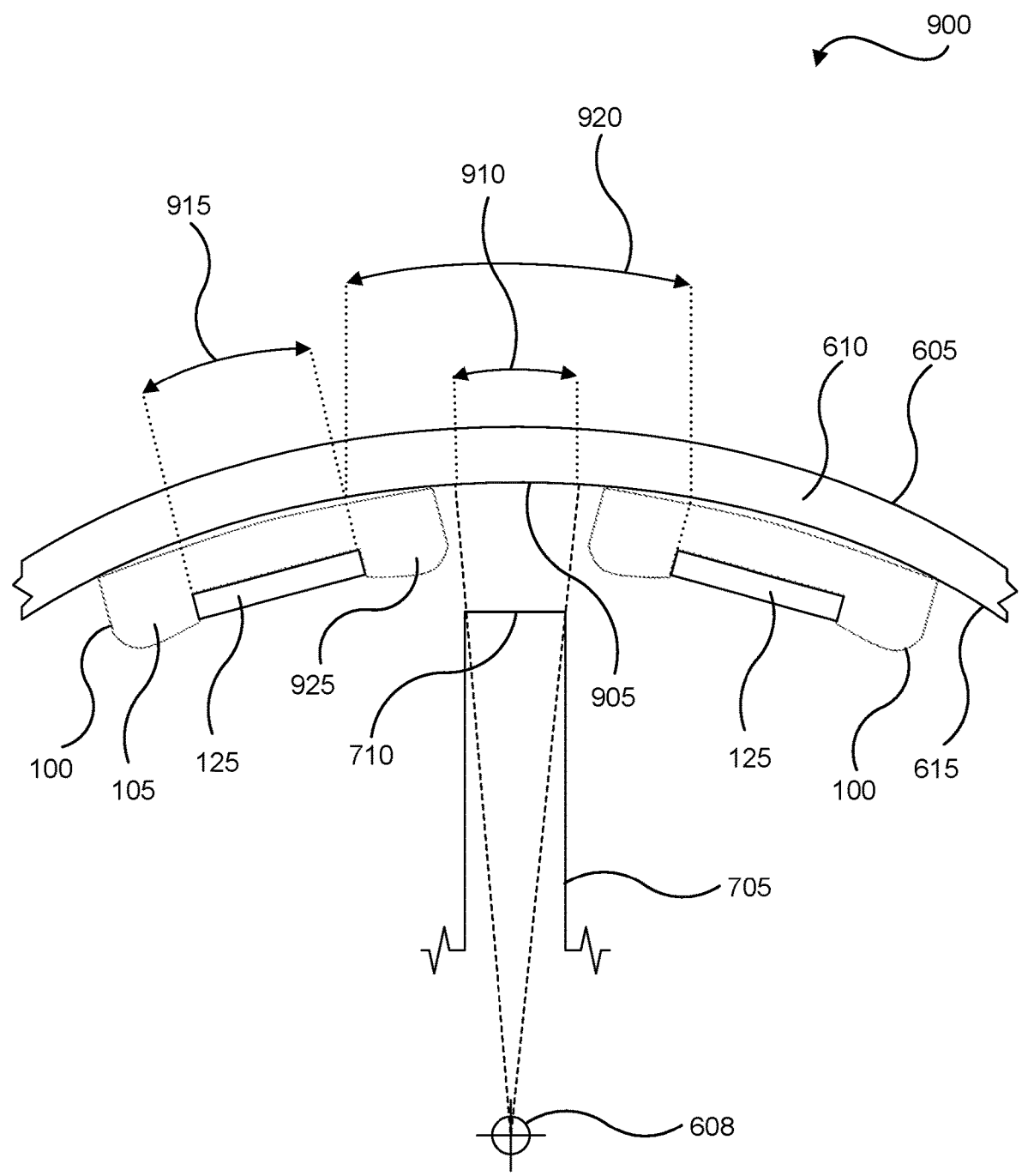
FIG. 9 shows a partial cross-sectional view of another example electric motor, in accordance with a non-limiting implementation of the present specification.

Turning now to FIG. 9, a partial cross-sectional view is shown of an example electric motor 900. Motor 900 may be similar to motor 600, with one difference being that motor 900 uses devices 100 as its rotor permanent magnets, instead of devices 300 which are used in motor 600. Cross-hatchings are omitted from FIG. 9 for ease and clarity of illustration.

As shown in FIG. 9, stator tooth end 710 may have a radial projection 905 on inner surface 615 of backiron 610 of rotor 605. Projection 905 has a width 910 in the circumferential direction. The circumferential direction may be the direction that runs along the circumference of rotor 605. Similarly, high coercivity member 125 may have a radial projection on inner surface 615, which may have a width 915 in the circumferential direction. Likewise, the radial projection on inner surface 615 of the gap between high coercivity members 125 of two adjacent devices 100 may have a width 920 along the circumferential direction. In some examples, width 910 may be smaller than width 915 and width 920.

Furthermore, in some examples width 910 may be smaller than width 205 (shown in FIG. 2) of high coercivity member 125. In addition, in some examples width 910 may be smaller than the gap measured in the circumferential direction between adjacent high coercivity members 125.

To stator tooth 705 and its windings (not shown), high coercivity members 125 represent a strong magnetic field and the gap between adjacent high coercivity members represent a relatively weaker magnetic field. If width 910 were to be larger than widths 915 and 920, the radial projection of stator tooth 705 would straddle or span a strong magnetic field region and a weaker magnetic filed region at all rotational positions of rotor 605 relative to stator tooth 705. Setting width 910 to be smaller than width 915 and 920 may avoid this straddling for at least some of the rotational positions of rotor 605 relative to stator tooth 705.

In some examples, the relative circumferential widths discussed in relation to motor 900 may also apply to motor 600 and the other motors described herein. Moreover, in some examples the gap between adjacent magnetic devices secured to the rotor may comprise air or a different material. Furthermore, as shown in FIG. 9, a lateral portion 925 of device 100 may extend into the gap between adjacent high coercivity members 125. The material of member 105 may have a magnetic coercivity lower than the magnetic coercivity of high coercivity members 125. As such, lateral portion 925 may present a magnetic coercivity, and a corresponding magnetic field strength, that is intermediate between those of the high coercivity member and those of the gap between the adjacent high coercivity members. In this manner, in some examples the extension of lateral portion 925 in the gap between high coercivity portions may contribute to shaping or smoothing out the magnetic flux profile along the circumferential direction between the high coercivity members and the gap.

The shapes of the high and low coercivity members of the devices that are used as the magnets in the rotor, and their relative positions on the inner surface of the rotor, may be adjusted to tailor the magnetic flux profile along the circumferential direction of the rotor. Moreover, in FIG. 9 a small space or gap is shown between device 100 and inner surface 615 of backiron 610. This space or gap is for illustrative purposes, and it is contemplated that in some examples devices 100 may be flush against inner surface 615. Moreover, in some examples the side or surface of member 105 proximal to inner surface 615 may have a shape or curvature complementary to the shape or curvature of inner surface 615. This in turn may allow devices 100 to be flush against inner surface 615.

Figure 10:
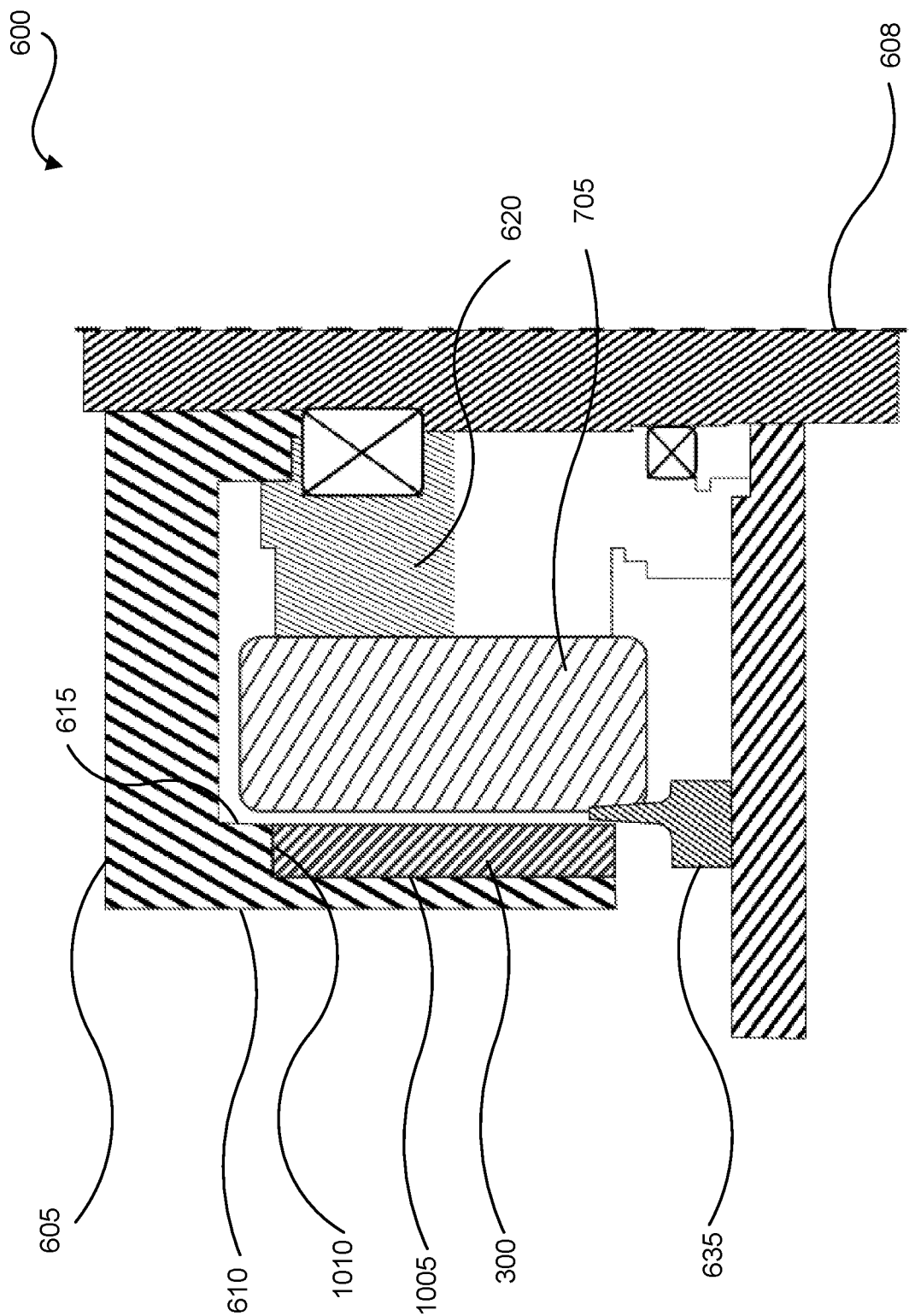
FIG. 10 shows another partial cross-sectional view of the motor of FIG. 6.

Turning now to FIG. 10, a partial cross-sectional view is shown of motor 600. The cross-section is taken along a plane that encompasses axis of rotation 608. As shown in FIG. 10, backiron 610 may comprise a channel 1005 in inner surface 615. Channel 1005 may define a longitudinal direction running along channel 1005. In some examples, this longitudinal direction may be about parallel to axis of rotation 608. Moreover, channel 1005 may terminate in a shoulder 1010 formed in backiron 610. Shoulder 1010 may define an end or backstop of channel 1005.

Channel 1005 may be shaped and sized to receive device 300. In addition, the position of channel 1005 in backiron 610 may allow device 300 to be aligned in the axial direction relative to the stator teeth. For example, channel 1005 may be used to center device 300 in the axial direction relative to tooth 705. In addition, FIG. 11 shows a partial cross-sectional view of rotor 605. Device 300 may be received or slid along direction 1105 in channel 1005 into its position in rotor 605. In some examples, direction 1105 may be about parallel to axis of rotation 608. While channel 1005 is described as extending along a longitudinal direction about parallel to the axis of rotation, it is contemplated that in some examples the channel in backiron 610 may extend along a longitudinal direction that need not be parallel to the axis of rotation.

To assemble rotor 605, devices 300 may be secured to backiron 610 of rotor 605. Sliding device 300 into place along channel 1005 and against inner surface 615 may avoid unexpected or unplanned movement of device 300 caused by the magnetic attractive force between device 300 and backiron 610. FIG. 12 shows a partial cross-sectional view of rotor 605, and illustrates an example direction 1205 along which magnetic attractive forces may pull device 300 towards backiron 610 if device 300 where to be moved towards backiron 610 along a direction 1210. Such magnetic attractive forces may cause pinching hazards, and may also cause device 300 to be dislodged from assembling tools when those tools approach backiron 610. Assembling rotor 605 by sliding device 300 in channel 1005 along direction 1105 may reduce the assembling challenges posed by the magnetic attractive force between device 300 and backiron 610 of rotor 605.

Turning now to FIG. 14, a perspective view is shown of an example device 1400, which device 1400 may be used as a hybrid magnet. Device 1400 may be similar in materials, structure, and function to devices 100, 300, and devices 1305 and 1310 shown in FIGS. 13A and 13B respectively. As such, device 1400 comprises a first member 1405 defining a trench extending along a longitudinal direction 1410. Device 1400 also comprises a plurality of secondary members 1415 secured to first member 1405. Secondary members 1415 are received in the trench of first member 1405, and are disposed side-by-side along longitudinal direction 1410. Moreover, members 125, 130, 325, 330, 335, 340, 345, and 350 may also be described as secondary members, which secondary members are received in the channels of their respective first members.

A difference between device 1400 and devices 100, 300, 1305, and 1310 is that in device 1400 secondary members 1415 collectively do not span the full dimension of first member 1405 along longitudinal direction 1410. In other words, a dimension 1420 of first member 1405 is larger than a dimension 1425 of secondary members 1415 collectively. In some examples, the trench in member 1405 may have a length along longitudinal direction 1410 commensurate with dimension 1425. It is also contemplated that in some examples, the trench in member 1405 may have a length along longitudinal direction 1410 that is longer than dimension 1425. Moreover, it is contemplated that in some examples, first member 1405 may comprise a plurality of segments positioned side-by-side along longitudinal direction 1410, similar to the first members described in relation to FIGS. 13A and 13B.

As discussed above, an example electric motor may be constructed of a rotor and a stator. The stator may comprise a magnetically-permeable material and a set of electrically-conductive windings. The rotor, in turn, may comprise a magnetically-permeable material and a set of permanently-magnetizable materials. In some examples, the rotor may have an axial length in excess of the axial length of the stator, such that the rotor is longer than the stator along the axis of rotation of the motor. In such examples, the rotor or the rotor magnet may be described as overhanging relative to the stator.

Moreover, in some examples the rotor may have an axial length which is about equal to the axial length of the windings disposed around the stator.

FIG. 15 shows a partial cross-sectional view of an example electric motor 1500. An electric motor may also be referred to as a "motor", in short. Motor 1500 comprises a rotor 1505 to rotate about an axis of rotation 1555 defining an axial direction. Rotor 1505 may comprise a backiron 1530 and a plurality of magnets 1535 secured to an inner surface 1531 of backiron 1530. In FIG. 15 the axial direction is along axis of rotation 1555, the radial direction is about perpendicular to the axial direction and in the plane of FIG. 15, and the circumferential direction extends about perpendicular to the plane of FIG. 15 (i.e. the circumferential direction is about perpendicular to the plane defined by the axial and radial directions).

In some examples, magnet 1535 may comprise a hybrid magnet. Moreover, in some examples, magnet 1535 may comprise the hybrid magnet of any one of devices 100, 300, 1305, 1310, 1400, or any other hybrid magnets described herein. It is also contemplated that in some examples, magnet 1535 need not comprise a hybrid magnet.

Magnet 1535 may comprise a first member 1540 defining a trench extending along a longitudinal direction. In motor 1500 the longitudinal direction is about parallel to the axial direction. While this trench is not visible in FIG. 15, it is contemplated that the trench may be similar to the trenches described herein in relation to devices 100, 300, 1305, 1310, or 1400. The trench may have a top being open and a bottom opposite the top. The bottom may be proximal to inner surface 1531 and the top may be distal from inner surface 1531 of backiron 1530. First member 1540 may comprise a first material being magnetizable as a permanent magnet. The first member may have a first axial dimension 1585 measured along the axial direction. While in motor 1500 the longitudinal direction is about parallel to the axial direction, it is contemplated that in some examples the magnets may be oriented relative the backiron of the rotor such that the longitudinal direction need not be parallel to the axial direction.

Magnet 1535 may also comprise a plurality of secondary members 1545 secured to first member 1540. While in FIG. 15 two secondary members 1545 are shown, it is contemplated that in some examples, magnet 1535 may comprise three or more secondary members. Secondary members 1545 may be received in the trench, and may be disposed side-by-side along the longitudinal direction of the trench. Secondary members 1545 may each comprise a corresponding secondary material being magnetizable as a corresponding permanent magnet.

Motor 1500 may also comprise a stator 1510 disposed inside rotor 1505 and centered about axis of rotation 1555. Stator 1510 may comprise a plurality of teeth 1515 each extending radially relative to axis of rotation 1555 towards inner surface 1531 of backiron 1530 and terminating in a corresponding tooth end 1520 disposed proximal to inner surface 1531. While FIG. 15 shows only one stator tooth 1515, it is contemplated that stator 1510 may comprise a plurality of stator teeth extending radially relative to the axis of rotation. In some examples, the structure of motor 1500 and its corresponding rotor and stator may be similar to the structure of motors 600 or 900 and their corresponding rotors and stators respectively.

Moreover, in motor 1500 each tooth end 1520 may have a second axial dimension 1590 measured along the axial direction. First axial dimension 1585 may be larger than second axial dimension 1590. In this manner, magnet 1535 may be said to overhang stator tooth 1515.

Motor 1500 may also comprise a plurality of conductive windings each disposed around a corresponding tooth of the stator. For example, windings 1575 may be disposed around tooth 1515 of stator 1510. Tooth end 1520 and its corresponding windings 1575 may collectively have a third axial dimension 1595 measured along the axial direction. In some examples, magnet 1535 may overhang the collective axial dimension of the stator tooth and its windings. In other words, dimension 1585 may be larger than dimension 1595.

In some examples, such axially longer or "overhanging" magnets may provide more flux and thus more force. In addition, axially longer magnets may provide more space to integrate sensors. Furthermore, axially longer magnets may reduce the axial positioning tolerance on the rotor relative to the stator, thus reducing manufacturing cost and complexity. The reduction in the axial positioning tolerance is described in greater detail in relation to FIG. 17.

Furthermore, in some examples, rotor 1505 may be positioned relative to stator 1510 in the axial direction such that axial dimension 1590 is positioned within an extent of axial dimension 1585 in the axial direction. Such a positioning or alignment may also enhance the magnetic performance of motor 1500 thereby enhancing the motive force that can be generated by motor 1500.

Moreover, while FIG. 15 shows secondary members 1545 spanning the full axial dimension 1585 of first member 1540, it is contemplated that in some examples, the magnet used in the rotor of motor 1500 may have secondary members that do not span the full axial dimension of the first member of the magnet. In other words, in such a hybrid magnet the secondary members may collectively have an axial dimension that is shorter than the axial dimension of the first member. An example of such a hybrid magnet is shown in FIG. 14, where dimension 1425 of secondary members 1415 is shorter than dimension 1420 of first member 1405. In some examples where such hybrid magnets are used in motor 1500, the collective axial dimension of the secondary members may be larger than dimension 1590 of tooth end 1520 of stator tooth 1515. This may provide a high flux level at the centre of the stator, and the segmentation of the secondary material of the secondary members may reduce the losses in that same material.

In addition, in some examples where such hybrid magnets are used in motor 1500, the collective axial dimension of the secondary members may be larger than dimension 1595 of the combination of tooth end 1520 and its windings 1575. Generally, tailoring the collective axial dimension of the secondary members to be larger than the axial dimension of the stator teeth (with or without the windings) provides a variation of the overhanging magnet geometry, and allows for further adjusting the magnetic performance of motor 1500.

Moreover, in some examples, the secondary materials of the secondary members may be more expensive than the first materials of the first member, and using less of the secondary materials (as would be allowed for example by the design of device 1400 compared to the design of device 300) may reduce the cost of the hybrid magnet device that uses less of the secondary materials.

Motor 1500 also comprises a shaft 1560 terminating in a shaft end 1565. Shaft 1560 may transmit the rotational force generated by rotor 1505 to components external to motor 1500. Rotor 1505 may comprise a receiving region 1580, disposed on inner surface 1531 of backiron 1530, to at least partially receive shaft end 1565 of shaft 1560. In some examples, once received in receiving region 1580, shaft 1560 may become non-freely-rotating about axis of rotation 1555 relative to rotor 1505. This non-freely-rotating relationship or coupling between the shaft end of the shaft and the rotor may allow the rotational force generated by the rotor to be transmitted to the shaft, to then allow the shaft to transmit that rotational force to components external to motor 1500.

In some examples, the cross-section of the shaft at the shaft end may have an outer perimeter shape that is non-circular. The receiving region of the rotor may have a shape that is complementary to the outer perimeter shape of this cross-section of the shaft. The non-circularity of this shape may allow the shaft to be non-freely-rotating about the axis of rotation when the shaft end is received in the receiving region. An example of such a non-circular shape is described in greater detail in relation to FIGS. 18 and 19A-D.

Moreover, in FIG. 15 shaft 1560 is shown as having a constant thickness along its length. It is contemplated that in some examples, the thickness or the cross-sectional shape of the shaft may vary along the length of the shaft. For example, the shaft may comprise a first segment along the length of the shaft proximal the shaft end and a second segment along the length of the shaft distal from the shaft end. The first segment may be tapered to thin when moving along the length of the shaft towards the shaft end. The thickness or cross-sectional shape of the shaft in the second segment may be constant or otherwise variable along the length of the shaft. In such examples, the receiving region of the rotor may also have a tapered shape complementary to tapered shape of the shaft in the first segment, to receive and abut at least a portion of the first segment when the shaft end is received by the receiving region. Examples of such a tapered shaft and tapered receiving region are described in greater detail in relation to FIGS. 18 and 19A-D While not shown in FIG. 15, it is contemplated that in some examples, motor 1500 may also comprise a fastener to secure the shaft to the rotor. In some examples, such a fastener may secure the shaft to the rotor by resisting the rotor and the shaft moving away from one another along the axial direction. An example of such a fastener is described in greater detail in relation to FIG. 18.

It is contemplated that in some examples, instead of or in addition to the features shown in FIG. 15, the receiving region may comprise a depression or an opening in the backiron to receive the shaft end. In some examples where the receiving region comprises an opening in the backiron, the shaft end and at least a portion of the shaft may pass through the opening in the backiron when the shaft end is received by the receiving region.

Furthermore, while FIG. 15 shows rotor 1505 as having receiving region 1580, it is contemplated that in some examples the rotor need not have a receiving region. In such examples, the shaft end may be secured to the backiron of the rotor using a securing method other than the shaft end being received in a receiving region having a complementary shape. For example, the shaft end may be welded, soldered, or otherwise secured to the backiron using an adhesive or fastener. Moreover, in some examples, the backiron and at least a portion of the shaft may be integrally formed. Furthermore, in some examples, the backiron may comprise one or more projections or features that are received by, or that otherwise mate or couple with, the shaft end.

In addition, in some examples motor 1500 may comprise a plurality of magnetic sensors 1550 used for measuring the angular position of rotor 1505 with respect to stator 1510, disposed along the circumferential direction. In some examples, the magnetic sensors may comprise Hall sensors, pickup coils, and the like. Such sensors may be arranged such that they are either axially or proximally related to the rotating magnetic components of the motor. Magnetic sensors might be configured to sense the magnetic field emitted by the rotor by being positioned near to the magnet 1535 and adjacent in the axial direction (i.e. about the same radius, along the edge of the rotor), or proximal along the radial axis (i.e. within the axial space enclosed by the rotor and closer to the stator, at a smaller radius than the magnetic materials). In these examples, the placement of such magnetic sensors may be axially separate from the location of the steel or highly magnetically permeable components around which the conductive windings 1575 of the stator 1510 are arranged. Such axial separation may reduce the temperature and thermal stress experienced by the magnetic sensors.

Figure 16:
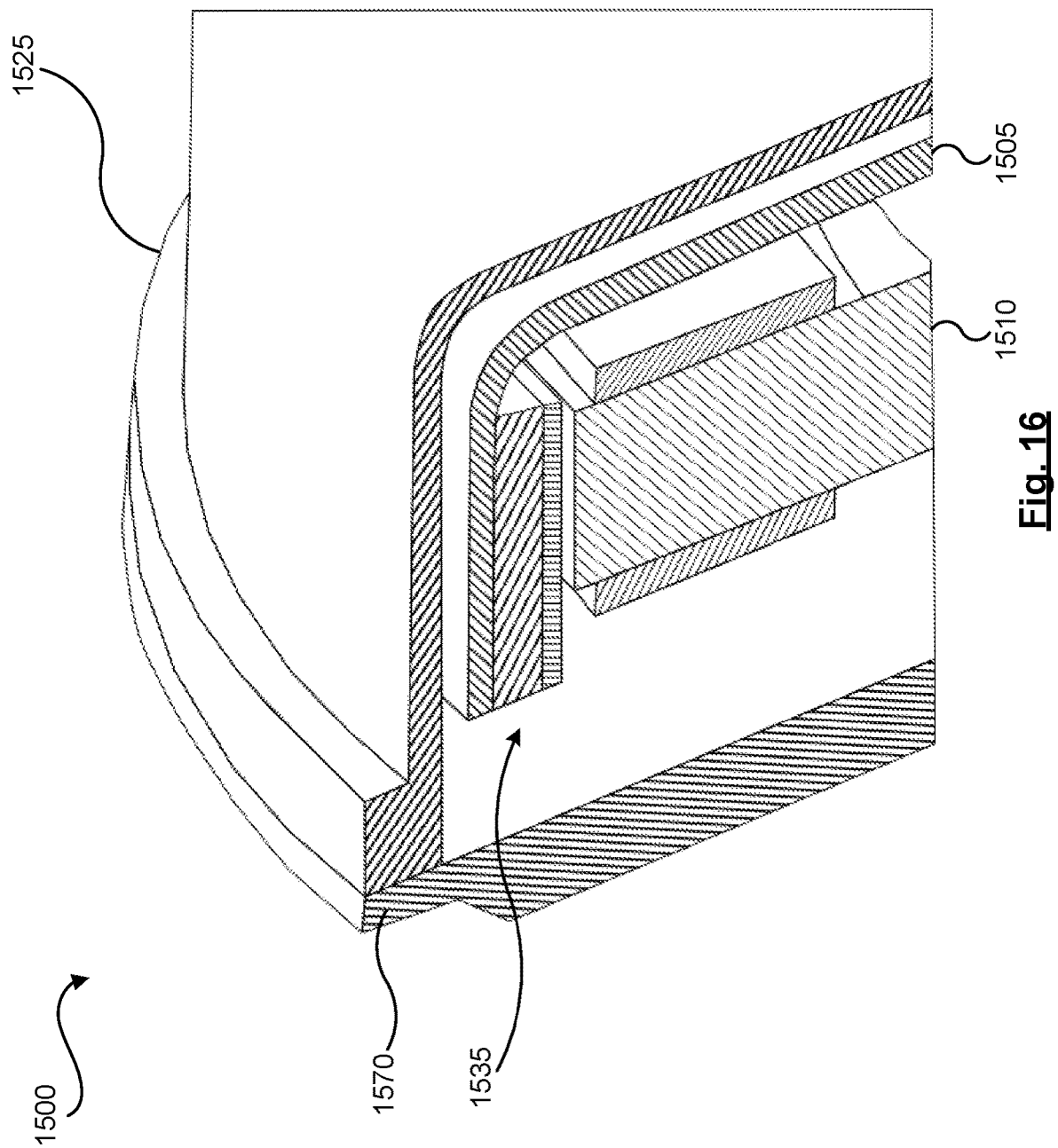
FIG. 16 shows a partial cutaway perspective view of the motor of FIG. 15.

Motor 1500 also comprises a housing 1525 connected to, or otherwise cooperating with, a motor backplate 1570 such that rotor 1505 and stator 1510 are protected from the external environment. In other words, housing 1525 and backplate 1570 may be assembled to form an enclosure around rotor 1505, shaft 1560, and stator 1510. FIG. 16 shows a partial cutaway perspective view of motor 1500 of FIG. 15. FIG. 16 shows housing 1525, and backplate 1570 in contact with housing 1525.

Figure 18:
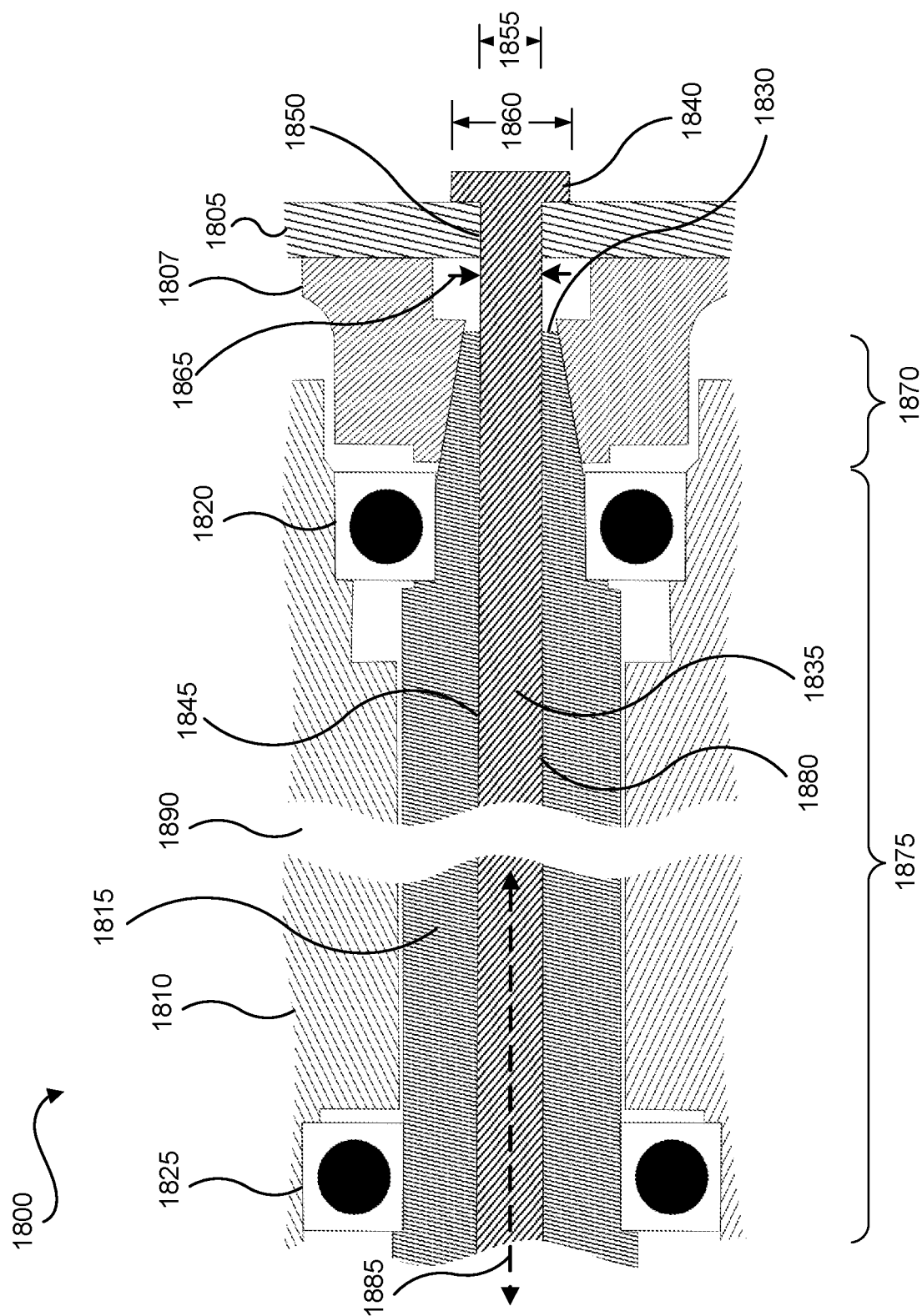
FIG. 18 shows a partial cross-sectional view of an example electric motor, in accordance with a non-limiting implementation of the present specification.

While not shown in FIG. 15, in some examples one or more bearings may be disposed between shaft 1560 and one or more of stator 1510 and backplate 1570. Examples of such bearings are shown in FIG. 18. It is contemplated that in some examples motor 1500 may have more or fewer components than those shown in FIG. 15. In addition, in some examples the shapes, relative sizes, or relative positions of one of more components of motor 1500 may be different than those shown in FIG. 15.

Figure 17:
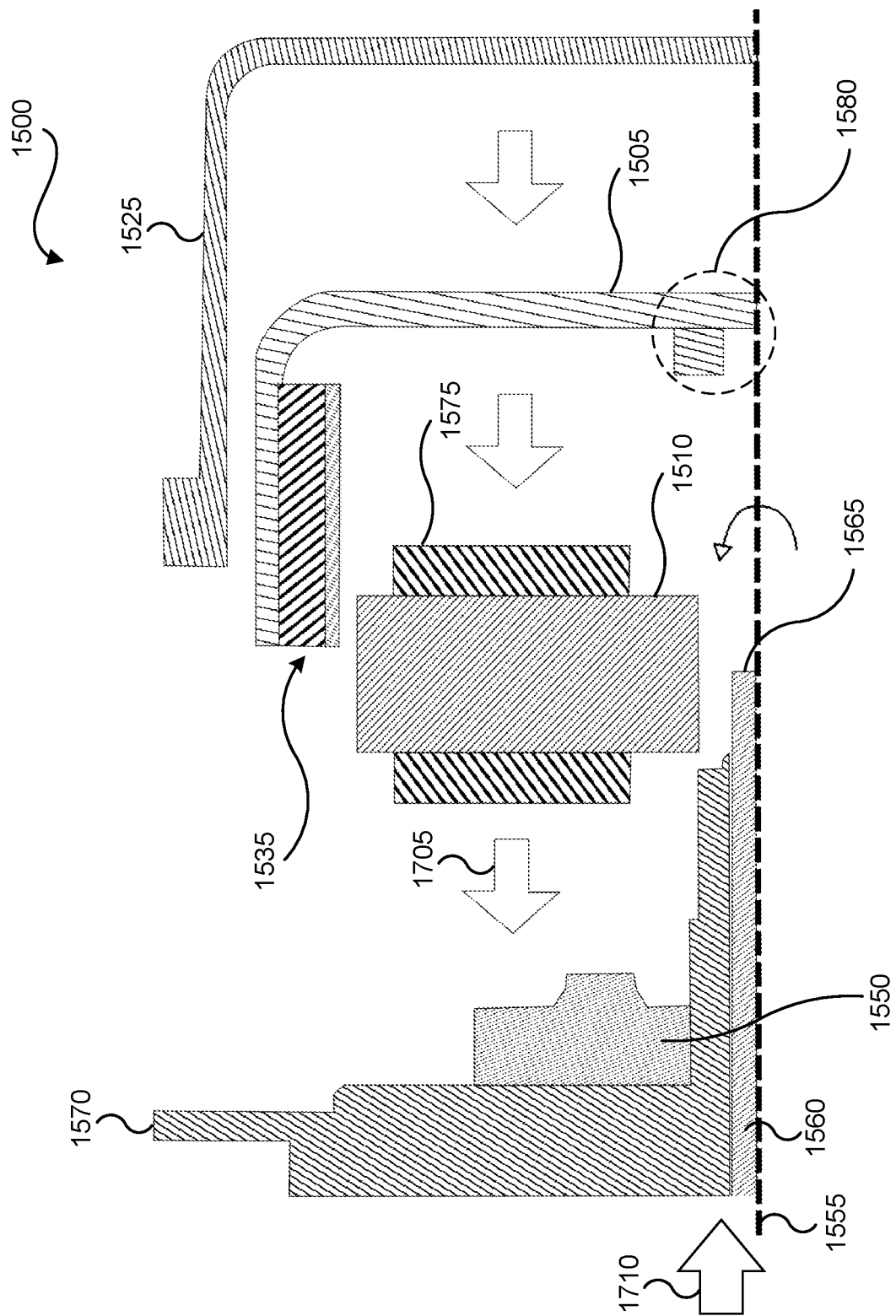
FIG. 17 shows an exploded partial cross-sectional view of the motor of FIG. 15.

Turning now to FIG. 17, an exploded partial cross-sectional view is shown of electric motor 1500. As shown in FIG. 17, the design of motor 1500 may allow various components of motor 1500 to be assembled by bringing together the components along the axial directions defined by, and along, axis of rotation 1555. For example, rotor 1505 and stator 1510 may be installed along direction 1705. Shaft 1560 may be installed along direction 1710 to allow shaft end 1565 to be received in receiving region 1580 of rotor 1505. Housing 1525 may also be installed along direction 1705 to cooperate with backplate 1570 to form an enclosure for the rotor, stator, and the shaft.

Functionally, this approach to assembly of motor 1500 may allow for an assembly where the rotor may be integrated into the motor from one side in an accurate manner. It may further allow the shaft to be installed separately from the rotor. Furthermore, the overhanging magnets may reduce the axial tolerance on the placement of the rotor, such that the shaft and the rotor/shaft interface may be allowed to vary in their axial dimension without materially affecting the performance of the motor.

In addition, the motor design and assembly shown in FIG. 117 may also allow for rotor 1505 to be mounted from one side, thereby allowing sensors 1550 to be mounted on the stationary backplate 1570, while allowing magnets 1535 on rotor 1505 to overhang stator 1510 from the other side.

Turning now to FIG. 18, a partial cross-sectional view is shown of an example motor 1800. Motor 1800 may be similar to motor 1500, with a difference being that in motor 1800 the receiving region of the rotor and the shaft shape are different than the receiving region and the shaft shape of motor 1500. In addition, FIG. 18 shows a partial view of motor 1800, focusing on the shaft end and the receiving region. It is contemplated that motor 1800 may comprise additional components similar to those of motor 1500, which additional components are omitted from FIG. 18 for clarity and simplicity of illustration. The outer boundaries of FIG. 18 are shown in an undulating manner, to indicate that FIG. 18 depicts a partial view and that motor 1800 may comprise components or component parts which extend beyond the boundaries of FIG. 18.

FIG. 18 shows a rotor 1805, a portion 1810 of a backplate, and a shaft 1815. Shaft 1815 terminates at a shaft end 1830. Bearings 1820 and 1825 are disposed between portion 1810 of the backplate and shaft 1815, and may allow shaft 1815 to rotate about axis 1885 of rotation relative to portion 1810 of the backplate. In some examples, the stator or stator teeth may be secured to portion 1810 of the backplate. While FIG. 18 shows two sets of bearings, it is contemplated that in some examples motor 1800 may comprise fewer or more bearings. Moreover, region 1890 in FIG. 18 is intended to indicate that, in some examples, the distance between bearings 1820 and 1825 relative to the sizes and positions of the other components of motor 1800 may be different than those shown in FIG. 18. In other words, regions 1890 is an illustrative tool to indicate that the distance between bearings 1820 and 1825 relative to the sizes and positions of the other components of motor 1800 may be different than those shown in FIG. 18.

Rotor 1805 may comprise a receiving region comprising a receiving component 1807 secured to an inner surface of the backiron of rotor 1805. In some examples, the receiving component may be integrally formed with the backiron. Moreover, in some examples, the receiving component may be formed separately from the backiron and then secured to the backiron. In addition, shaft 1815 may comprise a first segment 1870 proximal shaft end 1830 and a second segment 1875 distal from shaft end 1830. Segments 1870 and 1875 are defined along the length of shaft 1815.

Segment 1870 is tapered to thin when moving along the length of shaft 1815 towards shaft end 1830. The shape of sub-segments 1870 and 1875 is described in greater detail in relation to FIGS. 19A-D. Receiving component 1807 of the receiving region of rotor 1805 has a shape complementary to the tapered shape of first segment 1870 of shaft 1815. This complementary shape may allow shaft end 1830 and first segment 1870 to be received by the receiving region such that receiving component 1807 of the receiving region abuts at least a portion of segment 1870.

Motor 1800 also comprises a bolt 1835 which acts as a fastener to secure shaft 1815 to rotor 1805. Bolt 1835 comprises a bolt end 1840 and a threaded portion 1845. The treading of threaded portion 1845 is omitted in FIG. 18 for simplicity of illustration. Rotor 1805 comprises an opening 1850 having an opening diameter 1855. Bolt end 1840 has a diameter 1860 and threaded portion 1845 has a diameter 1865. Diameter 1865 is smaller than diameter 1855 to allow at least a portion of threaded portion 1845 to pass through opening 1850. Diameter 1860 of bolt end 1840 is larger than diameter 1855 of opening 1850 of rotor 1805.

Shaft 1815 comprises a depression 1880 in shaft end 1830, which depression 1880 extends into shaft 1815 along the axial direction along and defined by axis 1885 of rotation. While FIG. 18 shows depression 1880 extending the length of shaft 1815 visible in FIG. 18, it is contemplated that in some examples, the depression may be shallower and may extend into the shaft along a portion of the length of the shaft. To secure rotor 1805 to shaft 1815, threaded portion 1845 of bolt 1835 passes through opening 1850 and is at least partially received in depression 1880. In some examples, depression 1880 may have threaded walls to mate with the threading of threaded portion 1845 of bolt 1835. In this manner, bolt 1835 may secure rotor 1805 to shaft 1815 by resisting rotor 1805 and shaft 1815 from move away from one another along the axial direction.

While in FIG. 18 bolt 1835 is used to secure rotor 1805 to shaft 1815, it is contemplated that in some examples, different types or arrangements of fasteners may be used to secure the rotor to the shaft, to resist or prevent the shaft and the rotor moving away from one another in the axial directions.

In motor 1800, the cross-sectional shape of shaft 1815 in segment 1870 and the complementary shape of receiving component 1807 cause shaft 1815 to be non-freely-rotating relative to rotor 1805 when shaft end 1830 and segment 1870 are at least partially received in receiving component 1807 of the receiving region of rotor 1805. This non-freely-rotating coupling between rotor 1805 and shaft 1815 may allow rotational motion or force to be transmitted between rotor 1805 and shaft 1815. Bolt 1835 resists rotor 1805 and shaft 1815 moving away from one another along the axial direction, thereby keeping first segment 1870 received in and abutting receiving component 1807 of the receiving region of rotor 1805.

FIG. 19A shows a partial left side elevation view of shaft 1815 showing segment 1870 and a portion of segment 1875. FIG. 19B shows a front side elevation view of the shaft segments shown in FIG. 19A. In other words, FIG. 19B shows the shape of the cross-section of shaft 1815 at shaft end 1830, with the cross-section taken along a plane normal to the axial direction. The cross-section has an outer perimeter shape comprising line segments 1905, 1910, 1915, and 1920. Segments 1905 and 1915 are substantially straight lines, and segments 1910 and 1920 are substantially circular arcs. Depression 1880 is also shown in FIG. 19B.

While FIG. 19B shows the cross-section's outer perimeter shape comprising two substantially straight and two substantially arcuate segments, it is contemplated that in some examples other outer perimeter shapes may also be used including shapes comprising straight segments, shapes comprising one or more arcuate or curved segments, and shapes comprising a combination of straight and arcuate or curved segments. Receiving component 1807 of the receiving region of rotor 1805 has a shape complementary to the outer perimeter shape shown in FIG. 19B.

FIG. 19C shows a partial top side elevation view of the shaft segment shown in FIG. 19A. FIG. 19C shows a facet or plane 1925 in segment 1870 which causes the outer perimeter shape of the cross-section at shaft end 1830 to comprise substantially straight segment 1905. FIG. 19D shows the cross-section of FIG. 19B rotated by 90 degrees.

It is contemplated that in some examples, motor 1800 may comprise hybrid magnets similar to devices 100, 300, 1305, 1310, 1400, and the other hybrid magnets described herein. In addition, it is contemplated that in some examples, in motor 1800 the rotor magnet may overhang the stator teeth similar to the overhanging magnets described in relation to FIG. 15 or any of the other overhanding variations described herein.

Various combinations of the components and features described herein may also be utilized to provide corresponding subsets of benefits ascribed to the hybrid magnets when utilized with a stator of a given geometry. In some examples, the given stator geometry may include stators with an axial dimension less than that of the magnetic materials. In addition, in some examples the given stator geometry may include a component of the stator having an axial dimension less than that of the magnetic materials such that the flux entering or passing through the stator may have an axial vector component.

It is contemplated that in some examples the features or functionalities described herein in relation to any one of the magnet devices may be present in or added to any one of the other magnet devices. In addition, the features or functionalities described herein in relation to any one of the electric motors may be present in or added to any one of the other electric motors. Moreover, any of the magnet devices described herein may be used in any of the electric motors described herein.

Throughout this specification and the appended claims, infinitive verb forms are often used. Examples include, without limitation: "to rotate," "to abut," and the like. Unless the specific context requires otherwise, such infinitive verb forms are used in an open, inclusive sense, that is as "to, at least, rotate," to, at least, abut," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An electric motor comprising:
a rotor to rotate about an axis of rotation defining an axial direction, the rotor comprising a backiron and a plurality of magnets secured to an inner surface of the backiron, at least one of the magnets comprising:
a first member defining a trench extending along a longitudinal direction, the trench having a top being open and a bottom opposite the top, the bottom being proximal to the inner surface and the top being distal from the inner surface, the first member comprising a first material being magnetizable as a permanent magnet, the first member having a first axial dimension measured along the axial direction;
a plurality of secondary members secured to the first member, the secondary members received in the trench, the secondary members disposed side-by-side along the longitudinal direction, the secondary members each comprising a corresponding secondary material being magnetizable as a corresponding permanent magnet;
a stator disposed inside the rotor and centered about the axis of rotation, the stator comprising a plurality of teeth each extending radially relative to the axis of rotation towards the inner surface of the backiron and terminating in a corresponding tooth end disposed proximal to the inner surface, each tooth end having a second axial dimension measured along the axial direction, the first axial dimension being larger than the second axial dimension; and
a plurality of conductive windings each disposed around a corresponding tooth of the stator, each tooth end and its corresponding windings collectively having a third axial dimension measured along the axial direction.

2. The electric motor of claim 1, wherein:
once the first material is magnetized by an external magnetic field to have a flux density of greater than 0.2 Tesla, the first material retains a remanent flux density of greater than 0.2 Tesla in the absence of external magnetic fields; and
once the first material is magnetized, the first material is not demagnetized as a result of being subjected to an external magnetic field of 50 kilo Oersteds or less.

3. The electric motor of claim 1, wherein the rotor is positioned relative to the stator in the axial direction such that the second axial dimension is positioned within an extent of the first axial dimension in the axial direction.

4. The electric motor of claim 1, wherein the first axial dimension is larger than the third axial dimension.

5. The electric motor of claim 1, wherein:
the plurality of the secondary members disposed side-by-side along the longitudinal direction collectively have a fourth axial dimension measured along the axial direction; and
the fourth axial dimension is larger than the second axial dimension.

6. The electric motor of claim 5, wherein the first axial dimension is larger than the fourth axial dimension.

7. The electric motor of claim 5, wherein the fourth axial dimension is larger than the third axial dimension.

8. The electric motor of claim 1, wherein:
the trench comprises a width measured along a direction lateral to the longitudinal direction; and
the secondary members span the width of the trench.

9. The electric motor of claim 1, wherein the secondary materials each have magnetic coercivities larger than a corresponding magnetic coercivity of the first material.

10. The electric motor of claim 9, wherein:
the first material comprises ferrite; and
the secondary materials comprise NdFeB.

11. The electric motor of claim 1, wherein the at least one of the magnets is free of a direct electrically-conductive link between adjacent secondary members.

12. The electric motor of claim 11, wherein at least two adjacent secondary members abut in the longitudinal direction.

13. The electric motor of claim 1, wherein the longitudinal direction is about parallel to the axial direction.

14. An electric motor comprising:
a rotor to rotate about an axis of rotation defining an axial direction, the rotor comprising:
a backiron and a plurality of magnets secured to an inner surface of the backiron; and
a receiving region to at least partially receive a shaft end of a shaft of the electric motor;
a stator disposed inside the rotor and centered about the axis of rotation, the stator comprising a plurality of teeth each extending radially relative to the axis of rotation towards the inner surface of the backiron and terminating in a corresponding tooth end disposed proximal to the inner surface;
a plurality of conductive windings each disposed around a corresponding tooth of the stator;
the shaft having the shaft end received by the receiving region, the shaft being non-freely-rotating about the axis of rotation relative to the rotor when the shaft end is at least partially received by the receiving region; and
a fastener securing the shaft to the rotor by resisting the rotor and the shaft moving away from one another along the axial direction;
wherein:
the fastener comprises a bolt comprising a threaded portion having a first diameter connected to a bolt end having a second diameter;
the backiron comprises an opening having an opening diameter larger than the first diameter and smaller than the second diameter;
the shaft comprises a depression in the shaft end, the depression extending into the shaft along the axial direction; and the bolt securing the backiron to the shaft by the threaded portion passing through the opening and being at least partially received into the depression.

15. The electric motor of claim 14, wherein:
the shaft comprises a first segment along a length of the shaft proximal the shaft end and a second segment along the length of the shaft distal from the shaft end;
the first segment is tapered to thin along the length towards the shaft end; and
the receiving region is tapered to have a shape complementary to the first segment, the receiving region to abut at least a portion of the first segment when the shaft end is received by the receiving region.

16. The electric motor of claim 14, wherein:
the shaft has a cross-section at the shaft end, the cross-section having an outer perimeter shape comprising an about straight line and an about circular arc, the cross-section defined along a plane normal to the axial direction; and
the receiving region is shaped to have a shape complementary to the outer perimeter shape of the cross-section of the shaft.

17. The electric motor of claim 14, wherein the receiving region is disposed on the inner surface of the backiron.

18. An electric motor comprising:
a rotor to rotate about an axis of rotation defining an axial direction, the rotor comprising:
a backiron and a plurality of magnets secured to an inner surface of the backiron; and
a receiving region to at least partially receive a shaft end of a shaft of the electric motor;
a stator disposed inside the rotor and centered about the axis of rotation, the stator comprising a plurality of teeth each extending radially relative to the axis of rotation towards the inner surface of the backiron and terminating in a corresponding tooth end disposed proximal to the inner surface;
a plurality of conductive windings each disposed around a corresponding tooth of the stator;
the shaft having the shaft end received by the receiving region, the shaft being non-freely-rotating about the axis of rotation relative to the rotor when the shaft end is at least partially received by the receiving region; and
a fastener securing the shaft to the rotor by resisting the rotor and the shaft moving away from one another along the axial direction;
wherein at least one of the magnets comprises:
a first member defining a trench extending along a longitudinal direction, the trench having a top being open and a bottom opposite the top, the bottom being proximal to the inner surface and the top being distal from the inner surface, the first member comprising a first material being magnetizable as a permanent magnet; and
a plurality of secondary members secured to the first member, the secondary members received in the trench, the secondary members disposed side-by-side along the longitudinal direction, the secondary members each comprising a corresponding secondary material being magnetizable as a corresponding permanent magnet.

19. The electric motor of claim 18, wherein:
the first member has a first axial dimension measured along the axial direction; and
each tooth end has a second axial dimension measured along the axial direction, the first axial dimension being larger than the second axial dimension.

* * * * *